United States Patent
Cheyrezy et al.

(10) Patent No.: US 6,478,867 B1
(45) Date of Patent: Nov. 12, 2002

(54) METAL FIBRE CONCRETE, CEMENTITIOUS MATRIX AND PRE-MIXES FOR PREPARING MATRIX AND CONCRETE

(75) Inventors: Marcel Cheyrezy, Sèvres (FR); Jérôme Dugat, Montigny-le-Bretonneux (FR); Bernard Clavaud, Crémieu (FR); Gilles Orange, Soisy-sous-Montmorency (FR); Laurent Frouin, L'Hay-les-Roses (FR)

(73) Assignees: Bouygues Travaux Publics, Guyancourt (FR); Lafarge, Paris (FR); Rhodia Chimie, Courbevoie (FR)

( * ) Notice: Subject to any disclaimer, the term of this patent is extended or adjusted under 35 U.S.C. 154(b) by 0 days.

(21) Appl. No.: 09/555,378

(22) PCT Filed: Nov. 27, 1998

(86) PCT No.: PCT/FR98/02552
§ 371 (c)(1),
(2), (4) Date: Jun. 28, 2000

(87) PCT Pub. No.: WO99/28267
PCT Pub. Date: Jun. 10, 1999

(30) Foreign Application Priority Data

Nov. 27, 1997 (FR) ............................................. 97 14928

(51) Int. Cl.$^7$ .......................... C04B 22/04; C04B 22/06
(52) U.S. Cl. ........................................ 106/644; 106/640
(58) Field of Search ................................. 106/640, 644

(56) References Cited

U.S. PATENT DOCUMENTS

| | | | | |
|---|---|---|---|---|
| 5,503,670 A | * | 4/1996 | Richard et al. ............. | 106/643 |
| 5,948,157 A | * | 9/1999 | McKenney et al. ......... | 106/711 |
| 5,976,718 A | * | 11/1999 | Melcher ..................... | 106/601 |

* cited by examiner

Primary Examiner—Elizabeth D. Wood
(74) Attorney, Agent, or Firm—Foley & Lardner

(57) ABSTRACT

The invention concerns a concrete obtained by mixing with water, cement, granular elements, elements with puzzolanic reaction, constituents capable of improving the toughness of the matrix, metal fibers and at least a dispersing agent, in specified conditions and proportions. Said concrete has improved properties compared to prior art concrete comprising metal fibers.

48 Claims, 9 Drawing Sheets

METAL FIBRE CONCRETE, CEMENTITIOUS MATRIX AND PRE-MIXES FOR PREPARING MATRIX AND CONCRETE

The present invention relates to the field of concretes, more particularly to fibre-reinforced concretes. The main subject of the invention is an improved concrete, especially making it possible to manufacture elements of civil engineering structures, intended for constructing buildings and highway structures, and having properties superior to those of elements in the prior art. In particular, the present invention aims to obtain, for structural concretes, mechanical behaviour which is tough and ductile at the same time.

Structural analysis of concretes has shown that their mechanical properties are intimately linked to the presence of structural defects. Several types of defects distinguishable by their size may be observed in these concretes when they are subjected to mechanical loads.

On a smaller scale, the defect called microporosity is observed in concrete. This consists of pores, called capillaries, emanating from the intergranular spaces initially present in the fresh paste. Their size varies between 50 nm and a few $\mu$m.

On the next scale up, microcracking defects are observed. These are microcracks having openings ranging from 1 $\mu$m to a few hundreds of Am. They are non-coalescent, that is to say that they do not form a continuous path through the structure. They are mainly due to the heterogeneous character of concrete, the aggregate having mechanical and physical properties different from those of the binder/cement. These microcracks appear during mechanical loading. This type of defect is a major reason for the poor mechanical properties of concrete in tension and for its brittle character.

On the final scale, macrocracking defects are observed. The opening of these cracks varies from a few hundreds of $\mu$m to a few mm. These cracks are coalescent.

Major defects several millimetres in size may also be observed, these being due to poor preparation of the concrete (entrained air, faults in filling).

Solutions have been suggested either for decreasing the presence of these various defects or for reducing their effects on the mechanical properties of the concrete.

In order to improve the mechanical properties of concretes, it has been proposed to replace the sand of the cementitious matrix by other, higher-performance, constituents, but the cost of the concrete rises to an unacceptable level for it to be conceivably used widely in civil engineering because of the economic constraints which burden this field.

It has also been proposed to incorporate high-hardness aggregate into the concrete composition, but the amounts involved in order to achieve the desired performance also increase the manufacturing cost of the concrete excessively, given the high cost of such aggregate.

It has also been proposed to improve, sometimes spectacularly, certain mechanical properties of concrete by incorporating into it a high content of reinforcing fibres, namely, typically, a content of 10 to 15% by volume, but this content not only has a very significant effect on the manufacturing cost of the concrete but also makes its mixing, homogenization and possibly its casting too difficult or too critical to be applicable in civil engineering, especially under the working conditions of a construction site.

Also, it has been possible to partially control the microporosity by decreasing the water-to-cement weight ratio and by using plasticizers. The use of fine fillers, especially pozzolanic-reaction fillers, has also allowed the size of the micropores to be reduced.

However, the organization of the aggregate skeleton by the usual methods does not make it possible to obtain concrete with a satisfactory rheology under acceptable civil engineering operating conditions (poorly dispersed fibres, microstructural defects, etc.).

Microcracking itself has been greatly reduced by:
improving the homogeneity of the concrete, for example by limiting the size of the aggregate to 800 $\mu$m;
improving the compactness of the material (aggregate optimization and optional pressing before and during the setting phase);
carrying out heat treatments after setting.

With regard to macrocracking, this may be controlled by the use of metal fibres, but with the operating difficulties mentioned above.

By way of an illustrative document of the prior art, mention may be made of Patent Application WO-A-95/01316 which relates to a metal-fibre-reinforced concrete in which the fibre content is controlled and the fibre dimensions are chosen in defined proportions with respect to those of the aggregate particles.

This fibre-reinforced concrete comprises cement, aggregate particles, fine pozzolanic-reaction particles and metal fibres. The aggregate particles must have a maximum size D of at most 800 $\mu$m, the fibres must have an individual length 1 of between 4 and 20 mm and the ratio R of the average length L of the fibres to D must be at least equal to 10, the fibre content being such that the fibres occupy a volume of from 1 to 4% of the volume of the concrete after it has set.

The concrete obtained exhibits ductile behaviour or undergoes pseudo-work-hardening.

There is still a need to remove the aforementioned defects or to greatly reduce their effects, especially microcracks, as it may be seen that the work described in the prior art serves mainly to prevent the development of macrocracks and not of microcracks; microcracks are then only partially stabilized and develop under load.

The object of the present invention is to provide a concrete containing metal reinforcing fibres and having improved properties compared with similar concretes of the prior art.

Improved properties should be understood to mean both mechanical properties that are superior to those of known fibre-reinforced concretes and properties that are at least equal to those of known fibre-reinforced concretes, but these properties being achievable on an industrial scale in a constant and reproducible manner.

Another object of the present invention is to increase the stress level at which the first damage (i.e. microcracks) appears in the concrete and thus to increase the range of use of the concrete, namely the linear elastic behaviour of the concrete.

Yet another object of the present invention is to improve the work hardening of the concrete beyond the first damage by controlling the propagation of macrocracks. The purpose of the invention is thus to increase the range of use of the concrete beyond the first damage by improving the ductile behaviour of the concrete.

Another object of the invention is also to improve, by a synergy effect between the cementitious matrix and the fibres, the behaviour of the concrete both with respect to the appearance of microcracks and to the propagation of macrocracks.

"Cementitious matrix" should be understood to mean the hardened cementitious composition apart from the metal fibres.

Yet another object of the present invention, which is particularly important for obtaining concrete structures which, because of their size or the work site conditions, could not undergo a heat treatment, is to obtain, under improved conditions over the prior art and especially at temperatures close to ambient temperature (20° C.), a concrete having mechanical properties (in the sense mentioned above) at least equal to those which can only be obtained at the cost of a heat treatment in the case of the best known fibre-reinforced concretes.

In addition, the subject of the present invention is the cementitious matrix, which allows the concrete of the invention to be produced, and the premixes which comprise all or some of the constituents necessary for preparing this matrix or the concrete.

In its general form, the invention relates to a concrete consisting of a hardened cementitious matrix in which metal fibres are dispersed, obtained by mixing, with water, a composition which comprises, apart from the fibres:
  (a) cement;
  (b) aggregate particles having a maximum particle size Dmax of at most 2 mm, preferably at most 1 mm;
  (c) pozzolanic-reaction particles having an elementary particle size of at most 1 μm, preferably at most 0.5 μm;
  (d) constituents capable of improving the toughness of the matrix, these being chosen from acicular or flaky particles having an average size of at most 1 mm and present in a proportion by volume of between 2.5 and 35% of the combined volume of the aggregate particles (b) and of the pozzolanic-reaction particles (c);
  (e) at least one dispersing agent; and satisfying the following conditions:
    (1) the percentage by weight of water w with respect to the combined weight of the cement (a) and of the particles (c) is in the range 8–24%;
    (2) the fibres have an individual length l of at least 2 mm and an l/d ratio of at least 20, d being the diameter of the fibres;
    (3) the ratio R of the average length L of the fibres to the maximum particle size Dmax of the aggregate particles is at least 10;
    (4) the amount of fibres is such that their volume is less than 4% and preferably less than 3.5% of the volume of the concrete after it has set.

Thus, by virtue of a novel design of the aggregate skeleton and of its relationship with the reinforcing fibres, this approach solves the problem posed with this rheology/mechanical properties compromise.

The properties of the concrete according to the invention are not appreciably changed if aggregate particles (b) having a particle size exceeding 2 mm are also used within the matrix but in a proportion which does not exceed 25% of the volume of the combination of constituents (a)+(b)+(c)+(d).

The presence of this aggregate class in such a proportion may be regarded as a filler which does not contribute to the mechanical performance of the material in so far as:
  the D50 particle size of the combination of constituents (a), (b), (c) and (d) is at most 200 μm, preferably at most 150 μm; and
  the ratio R of the average length L of the fibres to the D75 particle size of the combination of constituents (a), (b), (c) and (d) is at least 5, preferably at least 10.

D75 particle size and D50 particle size should be understood to mean, respectively, the sizes of the screens whose undersize constitutes 75% and 50%, respectively, of the total volume of the particles.

The invention therefore also relates to a concrete consisting of a hardened cementitious matrix in which metal fibres are dispersed, obtained by mixing, with water, a composition which comprises, apart from the fibres:
  (a) cement;
  (b) aggregate particles;
  (c) pozzolanic-reaction particles having an elementary particle size of at most 1 μm, preferably at most 0.5 μm;
  (d) constituents capable of improving the toughness of the matrix, these being chosen from acicular or flaky particles having an average size of at most 1 mm and present in a proportion by volume of between 2.5 and 35% of the combined volume of the aggregate particles (b) and of the pozzolanic-reaction particles (c);
  (e) at least one dispersing agent; and satisfying the following conditions:
    (1) the percentage by weight of water W with respect to the combined weight of the cement (a) and of the particles (c) is in the range 8–24%;
    (2) the fibres have an individual length l of at least 2 mm and an l/d ratio of at least 20, d being the diameter of the fibres;
    (3) the ratio R of the average length L of the fibres to the D75 particle size of the combination of constituents (a), (b), (c) and (d) is at least 5, preferably at least 10;
    (4) the amount of fibres is such that their volume is less than 4% and preferably less than 3.5% of the volume of the concrete after it has set;
    (5) the combination of the constituents (a), (b), (c) and (d) has a D75 particle size of at most 2 mm, preferably at most 1 mm, and a D50 particle size of at most 150 μm, preferably at most 100 μm.

Conditions (3) and (5) apply to all the solid constituents (a), (b), (c) and (d) all together, excluding fibres, and not for each constituent taken individually.

Preferably, the toughness of the cementitious matrix is at least 15 J/m², advantageously at least 20 J/m².

The toughness is expressed either in terms of stress (stress intensity factor: $K_c$) or in terms of energy (critical strain energy release rate: $G_c$), using the formalism of linear fracture mechanics.

The measurement methods used to determine the toughness of the cementitious matrix will be described below in the part of the description pertaining to the examples.

The toughness of the cementitious matrix is obtained by adding to the cementitious composition particles (d) of average size of at most 1 mm, preferably at most 500 μm, these being in acicular form or in the form of flakes. They are present in a proportion by volume lying in the range 2.5–35%, in particular in the range 5–25%, of the combined volume of the aggregate particles (b) and of the pozzolanic-reaction particles (c).

On account of their function to improve the toughness of the matrix, the said particles will be called hereafter in the description "reinforcing particles".

The term "size" of the reinforcing particles should be understood to mean the size of their largest dimension (especially the length in the case of those of acicular form). These may be natural or synthetic products.

The reinforcing particles of acicular form may be chosen from among wollastonite fibres, bauxite fibres, mullite fibres, potassium titanate fibres, silicon carbide fibres, cellulose or cellulose-derivative fibres, such as cellulose acetate, carbon fibres, calcium carbonate fibres, hydroxyapatite fibres and other calcium phosphates, or derived products obtained by grinding the said fibres and mixtures of the said fibres.

Preferably, reinforcing particles are used whose acicularity, expressed by the length/diameter ratio, is at least 3 and preferably at least 5.

Wollastonite fibres have given good results. Thus, the presence of wollastonite fibres in the cementitious matrix leads to a reduction in the microporosity. This surprising effect is particularly apparent in the case of concretes which have undergone 20° C. maturing (see below).

The reinforcing particles in the form of flakes may be chosen from among mica flakes, talc flakes, mixed silicate (clay) flakes, vermiculite flakes, alumina flakes and mixed aluminate or silicate flakes and mixtures of the said flakes.

Mica flakes have given good results.

It is possible to use combinations of these various forms or types of reinforcing particles in the composition of the concrete according to the invention.

At least some of these reinforcing particles may have, on their surface, a polymeric organic coating which comprises a latex or is obtained from at least one of the following compounds: polyvinyl alcohol, silanes, siliconates, siloxane resins, polyorganosiloxanes or products from reaction between (1) at least one carboxylic acid containing from 3 to 22 carbon atoms, (2) at least one polyfunctional aliphatic or aromatic amine or substituted amine, containing from 2 to 25 carbon atoms and (3) a crosslinking agent which is a water-soluble metal complex containing at least one metal chosen from among: zinc, aluminium, titanium, copper, chromium, iron, zirconium and lead; this product is more particularly described in Application EP-A-0,372,804.

The thickness of this coating may vary between 0.01 and 10 $\mu$m, preferably between 0.1 and 1 $\mu$m.

The latices may be chosen from among styrene-butadiene latices, acrylic latices, styrene-acrylic latices, methacrylic latices and carbonylated and phosphonated latices. Latices having functional groups which complex with calcium are preferred.

The polymeric organic coating may be obtained by treating, in a fluidized bed or by using a FORBERG-type mixer, the reinforcing particles in the presence of one of the compounds defined above.

The following compounds are preferred: H240 polyorganosiloxane, Manalox 403/60/WS and WB LS 14 and Rhodorsil 878, 865 and 1830 PX siloxane resins, all sold by Rhodia-Chimie, and potassium siliconates.

This type of treatment is particularly recommended for reinforcing particles which are naturally occurring substances.

With regard to the metal fibres, these may be metal fibres chosen from among steel fibres, such as high-strength steel fibres, amorphous steel fibres or stainless steel fibres. Optionally, the steel fibres may be coated with a non-ferrous metal such as copper, zinc, nickel (or their alloys).

The individual length l of the metal fibres is at least 2 mm and is preferably in the 10–30 mm range. The l/d ratio is at least 20, and preferably at most 200, d being the diameter of the fibres.

Fibres having a variable geometry may be used: they may be crimped, corrugated or hooked at the ends. The roughness of the fibres may also be varied and/or fibres of variable cross-section may be used; the fibres may be obtained by any suitable technique, including by braiding or cabling several metal wires, forming a twisted assembly.

The fibre content is such that the fibres occupy a volume of less than 4%, and preferably of less than 3.5%, of the volume of the concrete after it has set.

Advantageously, the average bonding stress of the fibres in the hardened cementitious matrix must be at least 10 MPa, preferably at least 15 MPa. This stress is determined by a test comprising the extraction of a single fibre embedded in a block of concrete, as will be described below.

It has been observed that the concretes according to the invention, having both such a fibre-bonding stress and a high matrix toughness, (preferably of at least 15 J/m$^2$), result in superior mechanical performance, by synergy between these two properties.

The level of fibre/matrix bonding may be controlled by several means, which may be used individually or simultaneously.

According to a first means, the bonding of the fibres in the cementitious matrix may be achieved by treating the surface of the fibres. This fibre treatment may be carried out by at least one of the following processes:

fibre etching;

deposition of a mineral compound on the fibres, especially by depositing silica or a metal phosphate.

The etching may be carried out, for example, by bringing the fibres into contact with an acid, followed by neutralization.

Silica may be deposited by bringing the fibres into contact with silicon compounds, such as silanes, siliconates or silica sols.

In general, a metal phosphate is deposited using a phosphatizing process, which consists in introducing prepickled metal fibres into an aqueous solution comprising a metal phosphate, preferably manganese phosphate or zinc phosphate, and then in filtering the solution in order to recover the fibres. Next, the fibres are rinsed, neutralized and then rinsed again. Unlike the usual phosphatizing process, the fibres obtained do not have to undergo grease-type finishing; however, they may be optionally impregnated with an additive either in order to provide anticorrosion protection or to make it easier for them to be processed with the cementitious medium. The phosphatizing treatment may also be carried out by coating or spraying the metal phosphate solution onto the fibres.

Any type of phosphatizing process may be used—reference may be made on this subject to the treatments described in the article by G. LORIN entitled "The Phosphatizing of Metals" (1973), Pub. Eyrolles.

According to a second means, the bonding stress of the fibres in the cementitious matrix may be achieved by introducing into the composition at least one of the following compounds: silica compounds comprising mostly silica, precipitated calcium carbonate, polyvinyl alcohol in aqueous solution, a latex or a mixture of the said compounds.

The phrase "silica compound comprising mostly silica" should be understood here to mean synthetic products chosen from among precipitated silicas, silica sols, pyrogenic silicas (of the Aerosil type), aluminosilicates, for example Tixosil 28 sold by Rhodia Chimie, or clay-type products (either natural or derived), for example smectites, magnesium silicates, sepiolites and montmorillonites.

It is preferred to use at least one precipitated silica.

Precipitated silica should be understood here to mean a silica obtained by precipitation from the reaction of an alkali metal silicate with an acid, generally an inorganic acid, with a suitable pH of the precipitation medium, in particular a basic, neutral or slightly acid pH; any method may be used to prepare the silica (addition of acid to a silicate sediment, total or partial simultaneous addition of acid or of silicate to a water or silicate-solution sediment, etc.), the method being chosen depending on the type of silica that it is desired to obtain; after the precipitation step there generally follows a step of separating the silica from the reaction mixture using any known means, for example a filter press or a vacuum filter; a filter cake is thus collected, which is washed if necessary; this cake may, optionally after crumbling, be dried by any known means, especially by spray drying, and then optionally ground and/or agglomerated.

In general, the amount of precipitated silica introduced is between 0.1% and 5% by weight, expressed as dry matter, with respect to the total weight of the concrete. Above 5%, rheologie problems during preparation of the mortar usually arise.

Preferably, the precipitated silica is introduced into the composition in the form of an aqueous suspension. This may especially be an aqueous silica suspension having:

a solids content of between 10 and 40% by weight;

a viscosity of less than $4\times10^{-2}$ Pa.s for a shear of 50 $s^{-1}$;

an amount of silica contained in the supernatant liquid of the said suspension after centrifuging at 7500 rpm for 30 minutes of more than 50% of the weight of the silica contained in the suspension.

This suspension is more particularly described in Patent Application WO-A-96/01787. The Rhoximat CS 60 SL silica suspension sold by Rhodia Chimie is particularly suitable for this type of concrete.

The cement (a) of the composition according to the invention is advantageously a Portland cement, such as the Portland cements CPA PMES, HP, HPR, CEM I PMES, 52.5 or 52.5R or HTS (high silica content).

The aggregate particles (b) are essentially screened or ground sands or mixtures of sands, which advantageously may comprise silicious sands, particularly quartz flour.

The maximum particle size D100 or Dmax of these particles is preferably at most 6 mm.

These aggregate particles are generally present in an amount of 20 to 60% by weight of the cementitious matrix, preferably from 25 to 50% by weight of the said matrix.

The fine pozzolanic-reaction particles (c) have an elementary particle size of at least 0.1 $\mu$m and at most 1 $\mu$m, preferably at most 0.5 $\mu$m. They may be chosen from among silica compounds, especially silica fume, fly ash, blast-furnace slag and clay derivatives, such as kaolin. The silica may be a silica fume coming from the zirconium industry rather than a silica fume coming from the silicon industry.

The water-cement weight ratio, conventional in concrete technology, may vary when cement substitutes, especially pozzolanic-reaction particles, are used. For the needs of the present invention, the weight ratio of the amount of water W with respect to the combined weight of the cement to the pozzolanic-reaction particles has therefore been defined. This ratio, thus defined, is between approximately 8 and 24%, preferably between approximately 13 and 20%. However, in the description of the examples, the water-to-cement ratio W/C will be used.

The composition according to the invention also comprises at least one dispersing agent (e). This dispersing agent is generally a plasticizer. The plasticizer may be chosen from among: lignosulphonates, casein, polynaphthalenes, particularly polynaphthalene-sulphonates of alkali metals, formaldehyde derivatives, polyacrylates of alkali metals, polycarboxylates of alkali metals and grafted polyethylene oxides. In general, the composition according to the invention comprises from 0.5 to 2.5 parts by weight of plasticizer per 100 parts by weight of cement.

Other additives may be added to the composition according to the invention, for example an anti-foam agent. By way of example, anti-foam agents based on polydimethylsiloxane or on propylene glycol may be used.

Among agents of this type, mention may be made especially of silicones in the form of a solution or in the form of a solid or, preferably, in the form of a resin, an oil or an emulsion, preferably in water. Most particularly suitable are silicones essentially comprising M repeat units ($RsiO_{0.5}$) and D repeat units ($R_2SiO$). In these formulae, the radicals R, which may be identical or different, are more particularly chosen from among hydrogen and alkyl radicals comprising 1 to 8 carbon atoms, the methyl radical being preferred. The number of repeat units is preferably in the 30 to 120 range.

The amount of such an agent in the composition is generally at most 5 parts by weight per 100 parts of cement.

All the sizes of the particles are measured by TEM (transmission electron microscopy) or SEM (scanning electron microscopy).

The matrix may also contain other ingredients as long as they do not prejudice the expected performance of the concrete.

The concrete may be obtained according to any process known to those skilled in the art, especially by mixing the solid constituents with water, forming (moulding, casting, injection, pumping, extrusion, calendering) and then hardening.

For example, in order to prepare the concrete the constituents of the matrix and the reinforcing fibres are mixed with the suitable amount of water.

Advantageously, the following order of mixing is respected:

mixing of the pulverulent constituents of the matrix (for example for 2 minutes);

introduction of the water and a fraction, for example half, of the admixtures;

mixing (for example for 1 minute);

introduction of the remaining fraction of the admixtures;

mixing (for example for 3 minutes);

introduction of the reinforcing fibres and the additional constituents;

mixing (for example for 2 minutes).

The concrete then undergoes maturing between 20° C. and 100° C. for the time necessary to obtain the desired mechanical properties.

Surprisingly, it has been found that maturing at a temperature close to ambient temperature gave good results, this being so by virtue of the choice of constituents in the composition of the concrete.

In this case, the concrete is left to mature at, for example, a temperature close to 20° C.

The maturing process may also involve a heat treatment between 60 and 100° C. at normal pressure on the hardened concrete.

The concrete obtained may be especially subjected to a heat treatment between 60 and 100° C. for between 6 hours and 4 days, with the optimum time being about 2 days and the treatment starting after the end of the mixture setting phase or at least one day after the onset of setting. In general, treatment times of 6 to 72 hours are sufficient within the aforementioned temperature range.

The heat treatment is carried out in a dry or wet environment or carried out according to cycles alternating between the two environments, for example 24 hours in a wet environment followed by 24 hours in a dry environment.

This heat treatment is implemented on concretes which have completed their setting phase, these preferably being aged for at least one day and better still aged for at least approximately 7 days.

The addition of quartz powder may be useful when the concrete is subjected to the aforementioned heat treatment.

The concrete may be pretensioned, by bonded wires or by bonded tendons, or post-tensioned, by single unbonded tendons or by cables or by sheaths bars, the cable consisting of an assembly of wires or consisting of tendons.

The prestressing, whether in the form of pretensioning or in the form of post-tensioning, is particularly well suited to products made of the concrete according to the invention.

This is because metal prestressing cables always have a very high, ill-used, tensile strength since the brittleness of the matrix which contains them does not allow the dimensions of the concrete structural elements to be optimized.

Progress has already been made in terms of the use of high-performance concretes; in the case of the concrete according to the invention, the material is homogeneously reinforced by metal fibres allowing it to achieve high mechanical performance in conjunction with ductility. The prestressing of this material, by means of cables or tendons, whatever the pretensioning mode, is then used almost to its full amount, thereby creating prestressed concrete elements that are very strong both in tension and in bending, and are therefore optimized.

The reduction in volume obtained, because of this increase in mechanical strength, can produce very light prefabricated elements. Consequently, there is then the possibility of having long-span concrete elements that are easily transportable because of their lightness; this is particularly well suited to the construction of large structures in which the use of post-tensioning is widely employed. In the case of this type of structure, the solution provides particularly favourable savings to be made in terms of work-site duration times and assembly.

In addition, in the case of a thermal cure, the use of pretensioning or post-tensioning significantly reduces shrinkage.

This property is particularly desirable and all of the above advantages associated with the very low permeability of the product—highly advantageous in the case of durability and maintenance of structures over time—mean that this material may validly be substituted for structures made of steel.

The concretes obtained according to the present invention generally have a direct tensile strength $R_t$ of at least 12 MPa.

They may also have a flexural strength $R_f$ in 4-point bending of at least 25 MPa, a compressive strength $R_c$ of at least 150 MPa and a fracture energy $W_f$ of at least 2500 J/m$^2$.

The invention also relates to the cementitious matrix intended for obtaining and for employing the concrete defined above.

Finally, the invention relates to premixes comprising all or some of the constituents necessary to prepare the concrete and the matrix defined above.

BRIEF DESCRIPTION OF THE DRAWINGS

FIG. 5 corresponds to a concrete specimen (Example 1) which has undergone 20° C. maturing.

FIG. 6 corresponds to a concrete specimen (Example 2) which has undergone a 90° C. heat treatment.

FIG. 7 corresponds to a concrete specimen containing wollastonite (Example 3) which has undergone 20° C. maturing.

Figure 1:
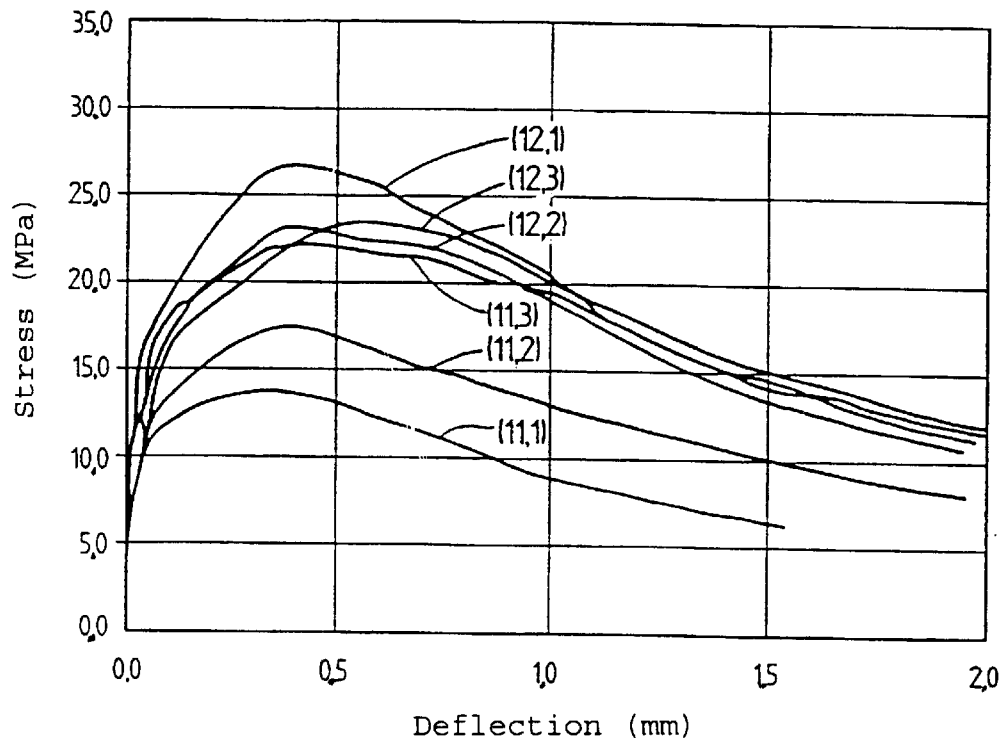
FIG. 1 is a graph obtained from the bending tests with the stress values (in MPa) plotted on the y-axis and the deflection values (in mm) plotted on the x-axis for concrete specimens with a W/C ratio of 0.24 and maturing at 20° C., respectively with wollastonite (curves 12.1, 12.2 and 12.3) and without wollastonite (curves 11.1, 11.2 and 11.3).

It will also be observed that an important characteristic of the present invention is to allow concretes to be obtained which have improved properties but which contain a markedly smaller amount of metal fibres than in many proposals of the prior art. In fact, according to the invention, amounts of metal fibres of less than 4% and preferably of less than 3.5% of the volume of the concrete after setting, and possibly especially of as low as 2% of the volume of the concrete after setting, as illustrated in the above examples, are sufficient to obtain concretes having improved mechanical properties. This surprising effect is due, as far as may be known, to the choice of the constituents of the composition of the concrete and of their proportions in this composition.

The examples which follow illustrate the invention without in any way limiting it.

EXAMPLES

Constituents

In order for the full significance of the comparisons made to be brought out, the same constituents have been used in the examples and are given below:

Portland cement (a): HTS (high silica content) type from Lafarge (France).

Sand (b): BE31 quartz sand from Sifraco (France).

Quartz flour (b): C400 grade with 50% of the particles smaller than 10 microns, from Sifraco (France) or C500 grade with 50% of the particles smaller than 5 microns, from Sifraco.

Vitreous silica (c): thermal microsilica from the manufacture of zirconium, of the "MST" type, with a "BET" surface area of 18 m$^2$/g, from S.E.P.R. (France).

Acicular-type reinforcing particle (d): wollastonite (CaSiO$^3$).

The product used is marketed by Nyco (Nyco Minerals Inc., Willsboro, N.Y., USA) under the name NYAD G, the characteristics of which are:

| | |
|---|---|
| size: | 1 = 300 microns on average (50 microns to 500 microns) |
| | d = 20 microns; | form factor: l/d=15;
particle size distribution:
<100 US Mesh (%): 99
<200 US Mesh (%): 87
<325 US Mesh (%): 65;
relative density: 2.9.

Reinforcing particle of the "ground" wollastonite type (d): The product used is the wollastonite NYCO 1250.

The wollastonite NYCO 1250 has an average size (D50) of 8 microns, with a form factor (l/d) of 3 and a particle size of:
<20 microns (%): 100
<10 microns (%): 96.

Flaky reinforcing particle (d): mica (muscovite: hydrated silicate of Al and K).

The product used is marketed by Kaolins d'Arvor, 56270 Ploemeur, France, under the name Micarvor MG 160, the characteristics of which are:
size: l=75 microns on average (10 microns to 200 microns);
thickness of the flakes: a few microns;
particle size distribution:
<0.160 mm (%): 98
<0.040 mm (%): 30;
relative density: 2.75.
Admixtures:
liquid dispersing agent X 404 from Mapei (Italy) or SSP104 manufactured by Takemoto Oil (Japan) and distributed by Mitsubishi or OPTIMA 100 manufactured and distributed by Chryso;
RHOXIMAT B 36 powder dispersing agent sold by Rhodia Chimie;
RHOXIMAT 6352DD anti-foam agent sold by Rhodia Chimie;
RHOXIMAT CS60SL silica slurry sold by Rhodia Chimie.

Fibres: The metal fibres are steel fibres having a length of 13 mm, a diameter of 200 microns and an ultimate tensile strength of 2800 MPa, supplied by Bekaert (Belgium). When they are present, the fibres are introduced in an amount of 2% by volume, i.e. a weight relative to the cement of: 0.222.

Preparation of the Concrete Test Pieces

In the examples, the operating method for the manufacture of test pieces consisted in using a high-turbulence mixer with rotation of the container, of the EIRICH R02 type with a 5 litre capacity, or of the EIRICH R08 type with a 75 litre capacity or a low shear mixer of the HOBART or PERRIER type.

On average, in all the examples, the amount of entrained air is less than 3.5%.

Maturing

For the tests, two methods of treating the hardened concrete were used, one with 20° C. maturing and the other with a 90° C. heat treatment.

20° C. maturing: The test pieces are demoulded 48 hours after casting. They are then subjected to a treatment consisting in storing them under water at 20° C. for a minimum time of 14 days. The test pieces are machined (if necessary, depending on the test to be carried out) 26 days after casting, and the test is carried out 28 days after casting.

90° C. heat treatment: The test pieces are demoulded 48 hours after casting. They are then subjected to a heat treatment consisting in storing them in an oven at 90° C. for 24 hours in wet air and then for 24 hours in dry air. The optional machining is carried out 6 days after casting and the test is carried out at least 7 days after casting.

Measurements

The measurements pertain to the mechanical properties of the matrix, mainly the toughness, and to the mechanical properties of the final material with the metal fibres, in bending, in tension and in compression.

They are carried out with dimensions of test pieces suitable for the corresponding measurement.

Toughness

The methods of measuring the toughness of the cementitious matrix are as follows:

The tests are carried out in 3-point bending, using 40×40× 250 or 70×70×280 mm notched prisms, i.e. specimens of SENB geometry (the ASTM-E 399-83 procedure). A notch with a V-shaped profile is made on these prisms dry, using a milling cutter equipped with a diamond disc (precision disc with continuous rim). The relative depth a/w of the notch is 0.4 (a: depth of the notch; w: height of the specimen).

The critical stress intensity factor K$_c$ is obtained from the fracture load F and from the length of the crack a at the point of instability (test in displacement control mode, at 10$^{-2}$ mm/s, on a SCHENCK universal testing machine):

$$Kc = \frac{3}{2} \frac{Fl}{dw^2} \sqrt{aY}$$

where:
1 represents the distance between the support points (bending rig)=200 mm,
d and w are the depth and the height of the specimen, respectively, a is the length of the notch at the instant of fracture, Y is a shape parameter which depends on the crack length ($\alpha = a/w$).

In 3-point bending, it is preferred to use the following Y parameter (J. E. Srawley, International Journal of Fracture (1976), Vol. 12, pages 475 to 476):

$$Y = \frac{1,99 - \alpha(1-\alpha)(2,15 - 3,93\alpha + 2,7\alpha^2)}{(1+2\alpha)(1-\alpha)^{3/2}}$$

In the case of non-linear behaviour (ductile behaviour), the force F adopted for estimating the toughness corresponds to the end of the linear part of the force-displacement diagram; the point of instability then corresponds to the initiation of the crack.

The critical strain energy release rate G, may be obtained from the force-displacement curves, as long as the contributions due to the spurious strains are removed and the dissipated energy is expressed in terms of the ligament cross-section: (w−a)×d.

In plane strain, there is a simple relationship between $K_c$ and $G_c$:

$$G_c = \frac{K_c^2(1-v^2)}{E}$$

where:

E is the elastic modulus, v represents Poisson's ratio.

E is obtained experimentally by vibrating a prismatic specimen placed on two supports, based on the determination of the fundamental frequency (GRINDOSONIC method).

Bonding

With regard to the bonding of the metal fibres in the cementitious matrix, the stress is determined by a test involving the extraction of a single fibre embedded in a concrete block.

The tests were carried out on continuous steel wire having a diameter d of 200 μm.

When the wires are treated, they are carefully degreased (alcohol/acetone) and then pickled (dilute hydrochloric acid). A phosphatizing-type treatment is then carried out (manganese or zinc phosphatizing). Special care is taken at the finishing stage: neutralization, rinsing and drying.

The wires are embedded in 4×4×4 cm concrete blocks. The composition used is the same as that used for the mechanical test pieces (bending, compression and tension): the water/cement ratio is fixed at 0.25.

The wires embedded over a length of 10 mm are extracted by pulling on them using a universal testing machine (SCHENCK) at a rate of 0.1 mm/min.

The force exerted is measured via a suitable force sensor and the displacement of the wire (with respect to the specimen) is measured via an extensometry sensor.

The average bonding stress is estimated from the following simplified formula:

$$\tau_d = \frac{F\max}{\pi \phi l_e}$$

where Fmax is the measured maximum force, $\phi$ is the diameter of the wire and $l_e$ is the embedment length.

Direct Tensile Strength: $R_t$

This is the value obtained in direct tension on dumb-bell test pieces machined from 70×70×280 mm prisms, i.e. a working section of 70×50 mm over a height of 50 mm. The carefully aligned test pieces are rigidly mounted in the test rig (UTS) with a single degree of freedom.

$$R_t = \frac{F\max}{70 \times 50}$$

where Fmax represents the maximum force (peak) in N for a fracture taking place in the central 70×50 mm section.

The test piece is fixed in the jaws of the tensile testing machine by adhesive bonding and then clamping by means of bolts.

Flexural Strength: $R_f$ $R_f$ is the value obtained in 4-point bending on 70×70×280 mm prismatic test pieces mounted on ball supports according to the NFP 18-411 and NFP 18-409 standards and ASTM C 1018.

$$Rf = \frac{3}{2}\frac{F\max(1-1')}{dw^2}$$

where Fmax represents the maximum force (peak force) in N, l=210 mm and l'=1/3 and d=w=70 mm.

Compressive Strength: $R_c$ $R_c$ is the value obtained in direct compression on a ground cylindrical specimen (70 mm diameter/140 mm height).

$$Rc = \frac{4F}{\pi d^2}$$

where F represents the force in N at fracture and d represents the diameter (70 mm) of the specimens.

Fracture Energy: $W_f$ $W_f$ is the value obtained by determining the total area under the force-deflection curve in a 4-point bending test on 70×70×280 mm prisms. The measured deflection is corrected so as to determine the true displacement of the specimen:

$$Wf = \frac{\int F\delta c}{dw}$$

where F is the applied force, δc is the true displacement (corrected deflection) and dw is the cross-section of the specimen.

Examples 1 to 17

Influence of the Reinforcing Elements (d)

By way of comparison, the results obtained from concretes in which the constituents of the composition have been varied and, for some of them, in which certain constituents have been omitted, especially the fibres, have been presented so as to bring out the surprising advantages resulting from using the combination of the constituents of a concrete composition according to the invention.

The results of Examples 1 to 17 have been given in Table I below, which provides the composition of the concrete specimens produced and their respective parameters.

The amounts of the reinforcing elements (d) are given in percentages by volume with respect to the combined volume of the aggregate particles (b) and of the pozzolanic-reaction particles (c).

The amounts of the other constituents of the concrete (a, b, c, admixture, water) are expressed in parts by weight.

The admixture used in these Examples 1 to 17 is a dispersant.

The sand used is the sand BE31, the particle size distribution of which is given in Example 24.

It may be seen that the presence of acicular reinforcing particles, especially of wollastonite, in a cementitious matrix of particularly low porosity, enhances load transfer between the fibres and the concrete, thus making it possible, by virtue of a synergy effect, to take optimum advantage of the fibres which are present in small amounts with respect to the concrete, and thus to improve the ductility of the material.

This combination of the porosity of the cementitious matrix, of acicular or flaky reinforcing particles and of metal fibres present in small amounts with respect to the concrete constitutes an important and novel aspect of the present invention.

The anisotropic reinforcing particles thus exert a major role in controlling microcracking and load transfer between

TABLE I

| Example No. | 1 | 2 | 3 | 4 | 5 | 6 | 7 | 8 | 9 | 10 |
|---|---|---|---|---|---|---|---|---|---|---|
| Portland cement (a) | 1 | 1 | 1 | 1 | 1 | 1 | 1 | 1 | 1 | 1 |
| Vitreous silica (c) | 0.325 | 0.325 | 0.325 | 0.325 | 0.325 | 0.325 | 0.325 | 0.325 | 0.325 | 0.325 |
| Quartz flour (b) | 0.300 | 0.300 | 0.300 | 0.300 | 0.300 | 0.300 | 0.300 | 0.300 | 0.300 | 0.300 |
| Acicular wollastonite (d) | 0 | 0 | 0.39 | 0.39 | 0 | 0.240 | 0 | 0 | 0 | 0.240 |
| Mica (d) | 0 | 0 | 0 | 0 | 0 | 0 | 0.220 | 0 | 0 | 0 |
| Ground wollastonite (d) | 0 | 0 | 0 | 0 | 0 | 0 | 0 | 0.150 | 0 | 0 |
| Sand (b) | 1.430 | 1.430 | 1.070 | 1.070 | 1.430 | 1.215 | 1.215 | 1.29 | 1.430 | 1.215 |
| Dispersant (solids content) | 0.01 | 0.01 | 0.02 | 0.02 | 0.02 | 0.02 | 0.02 | 0.02 | 0.01 | 0.02 |
| Water | 0.200 | 0.200 | 0.270 | 0.270 | 0.250 | 0.250 | 0.300 | 0.250 | 0.240 | 0.240 |
| Untreated fibres (volume %) | 0 | 0 | 0 | 0 | 0 | 0 | 0 | 0 | 2 | 2 |
| Treated fibres (volume %) | | | | | | | | | | |
| Maturing or heat treatment (° C.) | 20 | 90 | 20 | 90 | 90 | 90 | 90 | 90 | 90 | 90 |
| Toughness G (J/m$^2$) | 9 | 10 | 20 | 22 | 13 | 25 | 22 | 15 | 10 | 27 |
| Flexural strength (MPa) | 16.6 | 16.5 | 11.1 | 14.3 | | | | | 21.3 | 28.7 |
| Tensile strength (MPa) | 7.1 | 6.7 | 6.0 | 6.7 | | | | | 10.8 | 13.0 |
| Compressive strength (MPa) | | 198.2 | | 201.8 | | | | | 182.3 | 180.3 |

| Example No. | 11 | 12 | 13 | 14 | 15 | 16 | 17 |
|---|---|---|---|---|---|---|---|
| Portland cement (a) | 1 | 1 | 1 | 1 | 1 | 1 | 1 |
| Vitreous silica (c) | 0.325 | 0.325 | 0.325 | 0.325 | 0.325 | 0.325 | 0.325 |
| Quartz flour (b) | 0.300 | 0.300 | 0.300 | 0.300 | 0.300 | 0.300 | 0.300 |
| Acicular wollastonite (d) | 0 | 0.240 | 0 | 0 | 0 | 0 | 0.240 |
| Mica (d) | 0 | 0 | 0 | 0.220 | 0 | 0 | 0 |
| Ground wollastonite (d) | 0 | 0 | 0 | 0 | 0 | 0 | 0 |
| Sand (b) | 1.430 | 1.215 | 1.43 | 1.215 | 1.430 | 1.430 | 1.245 |
| Dispersant (solids content) | 0.012 | 0.015 | 0.015 | 0.015 | 0.015 | 0.015 | 0.015 |
| Water | 0.240 | 0.240 | 0.300 | 0.300 | 0.250 | 0.250 | 0.250 |
| Untreated fibres (volume %) | 2 | 2 | 2 | 2 | 2 | 0 | 0 |
| Treated fibres (volume %) | 0 | 0 | 0 | 0 | 0 | 2 | 2 |
| Maturing or heat treatment (° C.) | 20 | 20 | 90 | 90 | 90 | 90 | 90 |
| Toughness G (J/m$^2$) | 10 | 26 | 9 | 24 | 12 | 12 | 29 |
| Flexural strength (MPa) | 18.5 | 25.1 | 14 | 25 | 19 | 26 | 34 |
| Tensile strength (MPa) | 7.7 | 11.1 | | | | | |

N.B.: In Table I, the quantities of the constituents of the composition are expressed in parts by weight, the quantity of cement being taken as reference and equal to one part by weight, apart from the fibres, which, when they are present, are indicated as a percentage of the total volume of the composition, $D_{50} = 75$ μm and $D_{75} = 350$ μm Comparison of Examples 1 and 2 (specimens without wollastonite) with Examples 3 and 4 (specimens with 17% acicular wollastonite) shows an almost twofold increase in the toughness of a concrete not containing metal fibres. Similar results are obtained by comparing Example 5 (a specimen without wollastonite) with Example 6 (a specimen with 10% acicular wollastonite), again for a concrete without fibres. This improvement in toughness (addition of wollastonite) depends on the quality and of the nature of the cement.

The toughness of concrete with metal fibres but without wollastonite is 10 J/m2 (Example 9) and increases to 27 J/m2 when 10% wollastonite is incorporated (Example 10).

The overall fracture energy results from a cumulative effect of the energy expended by the matrix (toughness $G_c$) and of the energy dissipated by the metal fibres.

matrix and metal fibres. An improvement in the mechanical properties of the material in bending, tension and compression is also observed.

The use of mica-type flaky reinforcing particles (Example 7) also provides a marked improvement in the toughness.

The use of reinforcing particles of the ground wollastonite type (Example 8) has a positive effect on the toughness of the matrix, but to a lesser extent than in the case of acicular wollastonite.

The introduction of an acicular reinforcing particle results in a significant increase in toughness; this increases is smaller when the acicularity factor (or size) is reduced.

Similar observations may be made in the case of the other mechanical properties. Thus, the use of acicular wollastonite markedly improves the flexural strength: compare Example 11 (no acicular wollastonite) with Example 12 (with acicular wollastonite). The same applies to mica-type reinforcements: compare Example 13 (without mica) with Example 14 (with mica).

In general, the 90° C. heat treatment has a favourable effect on the flexural strength, which is thus improved.

However, even with 20° C. maturing, the flexural strength is increased by introducing acicular wollastonite (compare Example 12 with Example 11, the latter being carried out on a composition without wollastonite).

Moreover, adding acicular wollastonite substantially improves the tensile strength both with 20° C. maturing and with 90° C. heat treatment: in this respect Examples 11 and 15 without acicular wollastonite (control) may be compared with Examples 12 and 17 with 10% acicular wollastonite.

On average, a +25% increase in the intrinsic direct tensile strength of fibre-reinforced concrete is observed because of the addition of wollastonite.

In all the examples, compressive strengths greater than 150 MPa are obtained for concrete compositions having W/C values of less than 0.27.

Moreover, introducing acicular wollastonite improves the uniformity of the mechanical properties of the concretes.

This advantageous aspect is illustrated by the graphs in FIG. 1 which show, as indicated previously, bending tests carried out on three test pieces of concrete compositions with fibres (W/C=0.24 and 20° C. maturing) that are in all points identical apart from the presence or absence of reinforcing particles of the acicular wollastonite type. The compositions without wollastonite, according to Example 11, give widely shifted curves (curves 11.1, 11.2 and 11.3), corresponding to a large scatter in the bending results. In contrast, with compositions containing wollastonite, namely 10% acicular wollastonite, according to Example 12, the three curves (curves 12.1, 12.2 and 12.3) obtained are very close together and almost coincident, which means that the scatter in the mechanical properties of the material is almost completely eliminated.

Figure 2:
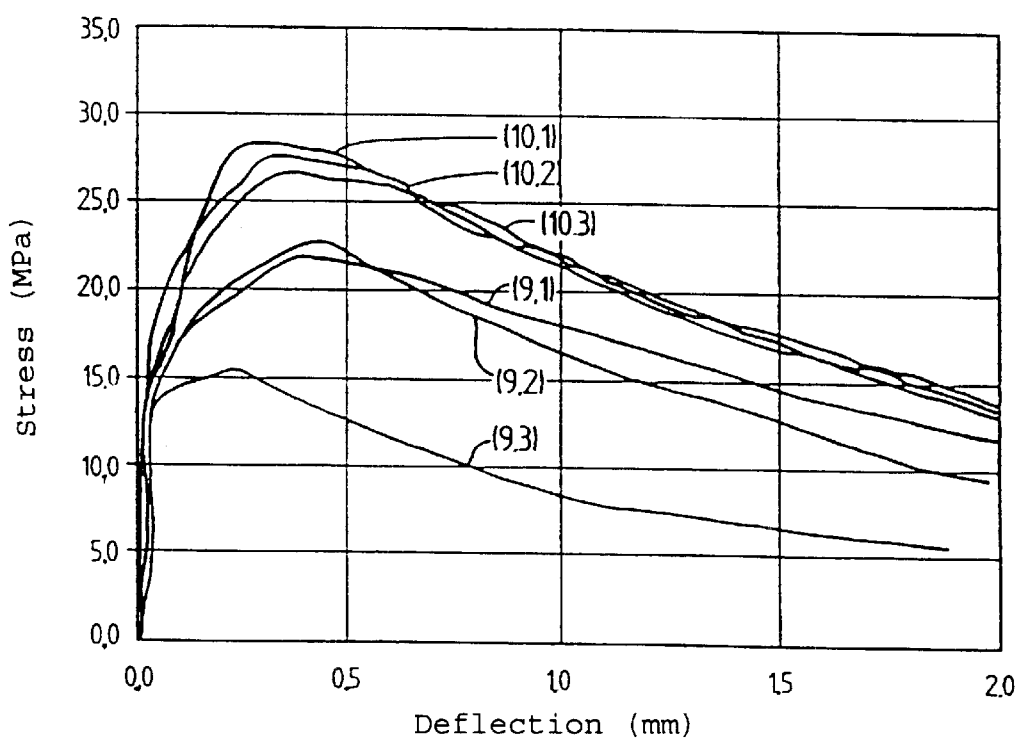
FIG. 2 is a graph similar to FIG. 1 but for concrete specimens of the same composition with a 90° C. heat treatment: with wollastonite (curves 10.1, 10.2 and 10.3) and without wollastonite (curves 9.1, 9.2 and 9.3).

The same observations apply to the graphs in FIG. 2 relating to test pieces of concretes without wollastonite according to Example 9, (curves 9.1, 9.2 and 9.3) and with wollastonite according to Example 10, (curves 10.1, 10.2 and 10.3), the concretes tested being concretes with fibres with a W/C value of 0.24 and a 90° C. heat treatment.

Example 17 relates to a concrete comprising both acicular wollastonite and treated fibres. It may be seen that the best performance in terms of toughness and of flexural strength is obtained for this concrete. Thus, it is better than the concrete of Example 10 which comprises only acicular wollastonite—and untreated fibres—and better than the concrete of Example 16 which comprises only treated fibres and not acicular wollastonite.

The combination of bonded fibres and a high-toughness matrix really does result in improved performance.

Figure 5:
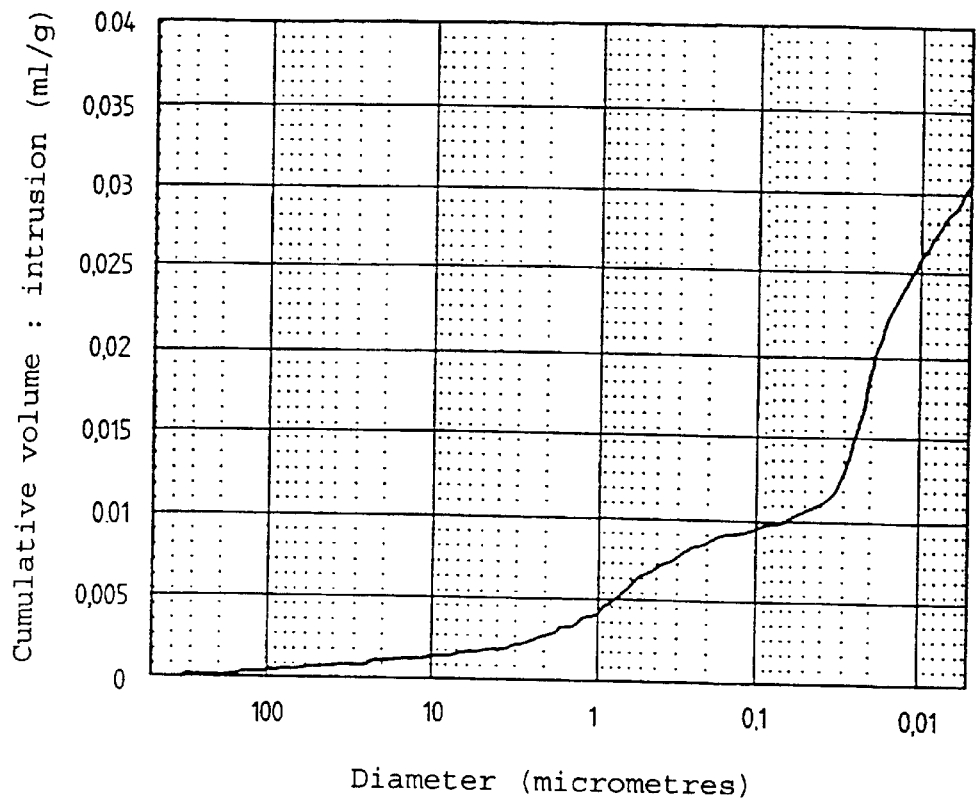
FIGS. 5 to 7 show the porosity of concrete specimens, this being determined by the mercury intrusion technique: plotted on the y-axis is the cumulative volume (ml/g) and on the x-axis the diameter (in micrometres) of the pores.
Figure 6:
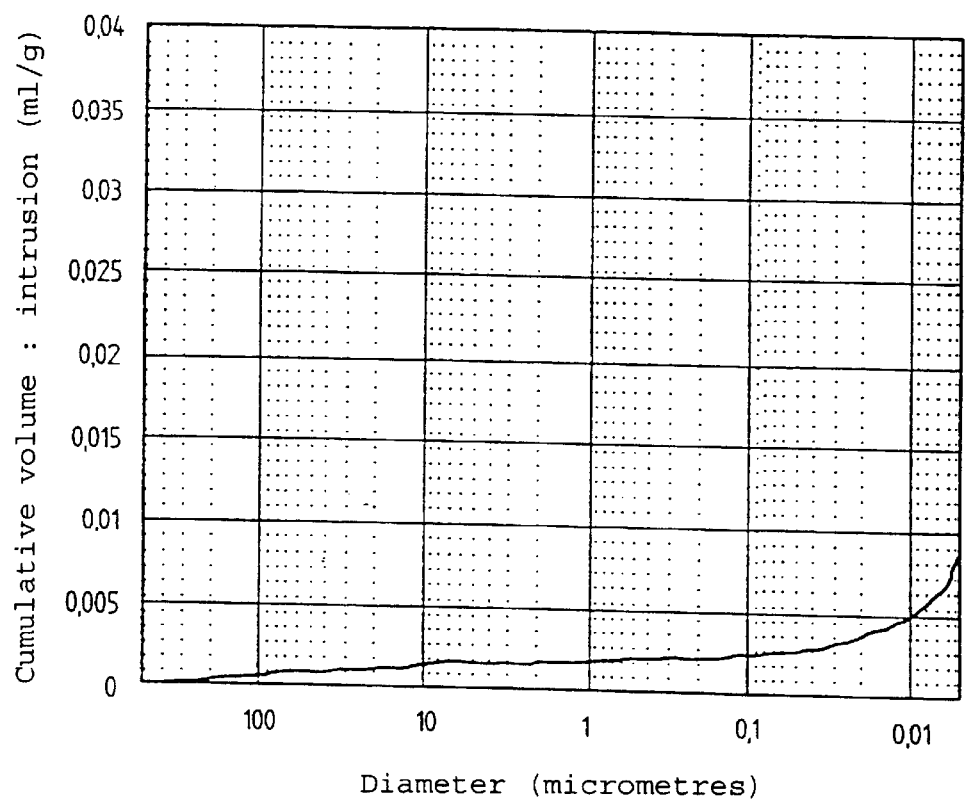
Figure 7:
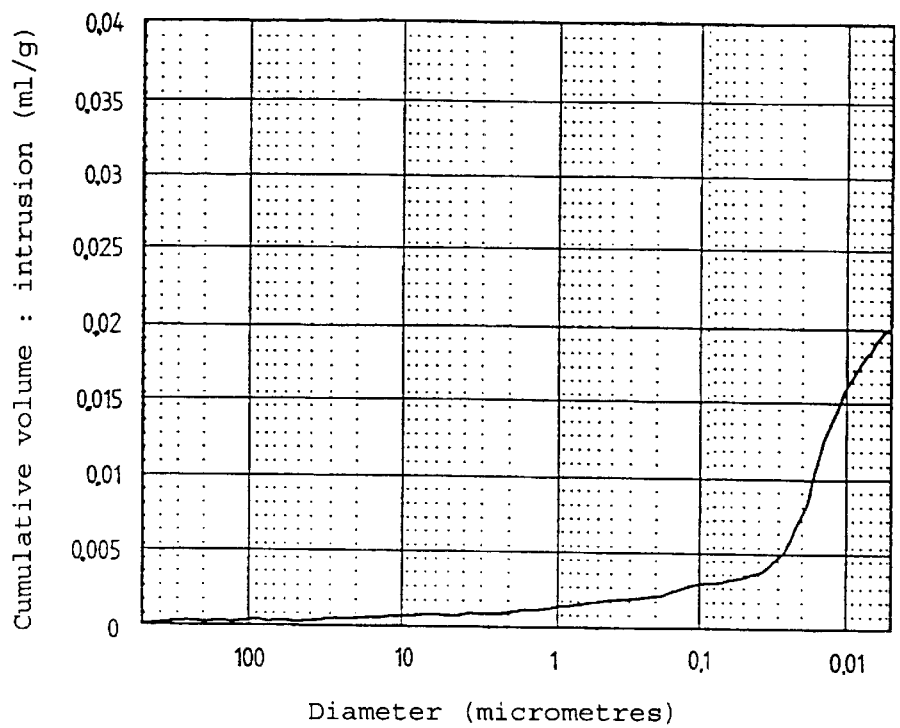
Figure 8:
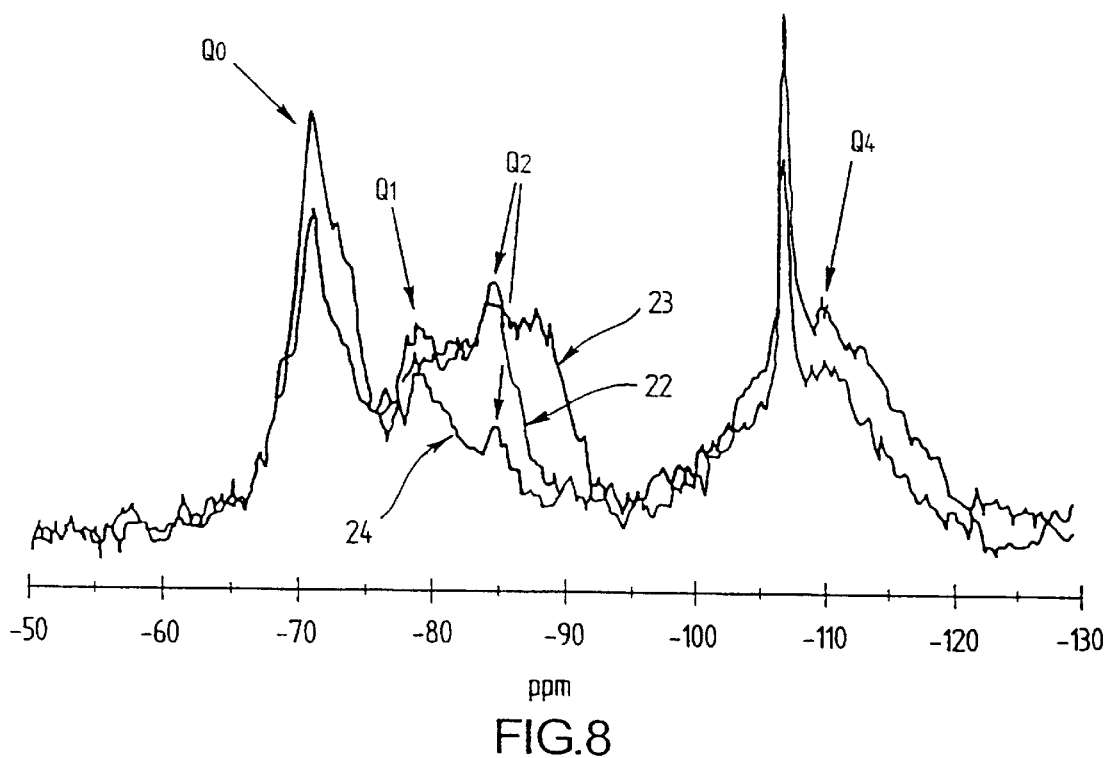
FIG. 8 is a graph resulting from $^{29}$Si nuclear magnetic resonance analysis of a concrete according to the invention containing wollastonite and matured at 20° C. (curve 23) compared with two same concretes having the same composition but not containing wollastonite, one having been subjected to a 90° C. heat treatment (curve 22) and the other having been matured at 20° C. (curve 24). It may be seen that there is little difference between the two curves 22 and 23, as regards peaks Q2. These peaks, relating to the double bonds of SiO$^4$ radicals, are all the more intense the longer the hydrate chains. It may therefore be concluded that adding wollastonite makes it possible to obtain at 20° C. a hydrate chain extension of the same order as that obtained by a 90° C. heat treatment of a composition without wollastonite.

It is clearly apparent from the curves in FIG. 5 (Example 1), FIG. 6 (Example 2) and FIG. 7 (Example 3) that, in the case of specimens of concrete without wollastonite, a low porosity is achieved only if the concretes are subjected to a heat treatment. On the other hand, the addition of wollastonite-type reinforcing particles to the composition of these concretes surprisingly leads to a low porosity, including in the case of concretes subjected to 20° C. maturing.

The addition of wollastonite thus makes it possible to achieve good densification of the concrete (reduced porosity), this being so even in the case of the normal 20° C. maturing conditions.

Examples 18–23

Influence of the Nature of the Fibres

Figure 4:
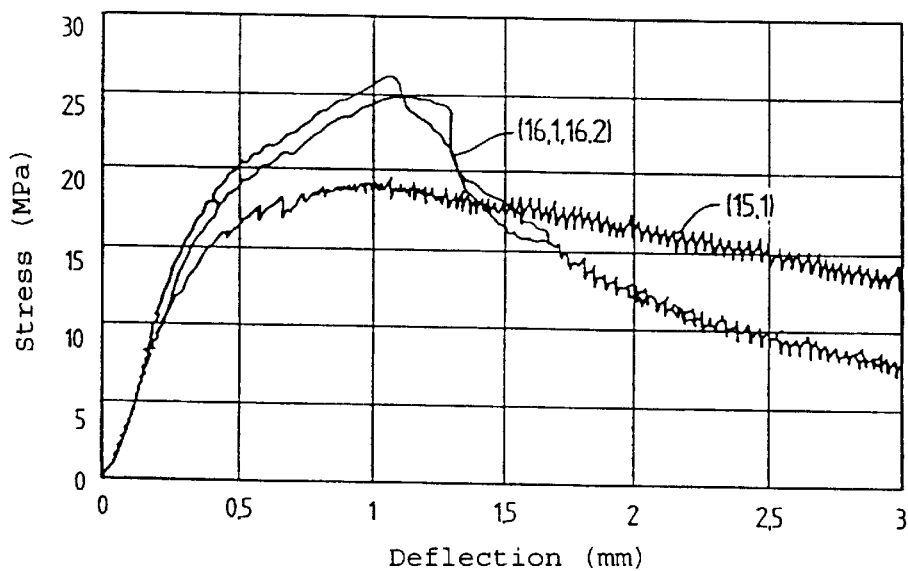
FIG. 4 is a graph obtained from bending tests for three specimens with a W/C ratio of 0.25 and a 90° C. heat treatment respectively with surface-treated fibres (curves 16.1 and 16.2) and untreated fibres (curve 15.1). Plotted on the y-axis are the values of the bending stress (in MPa) and plotted on the x-axis are the values of the deflection (in mm).

The above Examples 15 and 16 illustrate already the influence of the improvement in fibre treatment. Thus, FIG. 4 shows the improvement in the fibre/matrix bonding obtained by a surface treatment (phosphatizing) of the fibres (curves 16.1, 16.2) compared with untreated fibres (curve 15.1), the fibres being incorporated into a matrix as defined in Table I, in Example 15 (untreated fibres) and Example 16 (treated fibres).

Example 18

Treated or Untreated Rods

This example relates to rod-bonding tests carried out using the general method indicated above—except that the steel wires are replaced by steel rods having a diameter d=5 mm.

These rods are introduced into specimens of fibre-free concretes.

The composition of the concrete in parts by weight is as follows:

HTS Portland cement: 1
MST vitreous silica: 0.325
C400 quartz flour: 0.300
BE31 sand: 1.43
dispersant (solids content): 0.02
water: 0.25

The bonding tests were carried out on rods, one being made of untreated steel and the other made of steel treated by manganese phosphatizing according to the general protocol mentioned above except that these are steel rods and not steel wires.

With the untreated rod, the average bonding stress measured is 10 MPa while with the phosphatized rod it is 15 MPa.

Example 19

Treated or Untreated Steel Wires

This example relates to tests of the bonding of steel wires—and not of rods—carried out using the general method indicated above. The rods are introduced into specimens of fibre-free concretes having the same composition as that of Example 18.

The bonding tests were carried out on wires, one of them made of untreated steel and the other of steel treated by zinc phosphatizing according to the general protocol mentioned above.

Figure 9:
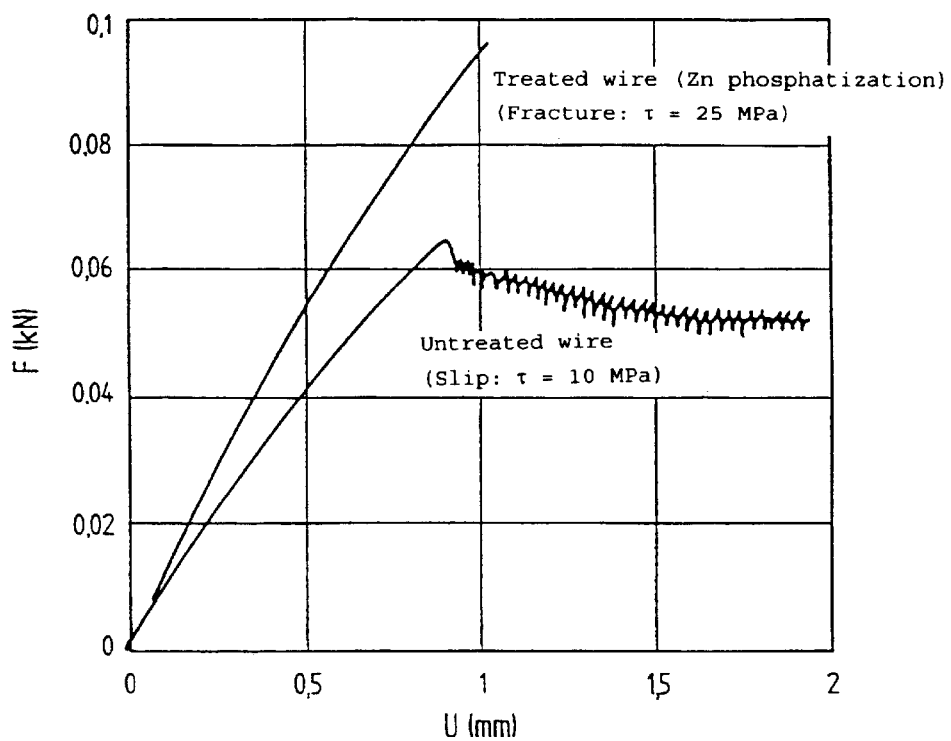
FIG. 9 is a graph obtained from tests of the bonding of treated or untreated steel wires. Plotted on the y-axis are the values of the pull-out force (kN) and plotted on the x-axis are the values of the displacement (mm) of the fibre.

The results are given in FIG. 9. It is clear from this example that the surface treatment carried out (phosphatizing) leads to a very high bonding level: the shear stress increases from 10 MPa (standard wire) to 25 MPa (treated wire)

Example 20

Use of Precipitated Silica to Improve Bonding

This example is intended to illustrate the improvement in the fibre/matrix bonding obtained by modifying the composition of the cementitious matrix of Example 18 by incorporating a precipitated silica, the said matrix being used in a concrete with untreated metal fibres, with a W/C value of 0.2 and a 24 h/24 h heat treatment at 90° C.

Figure 3:
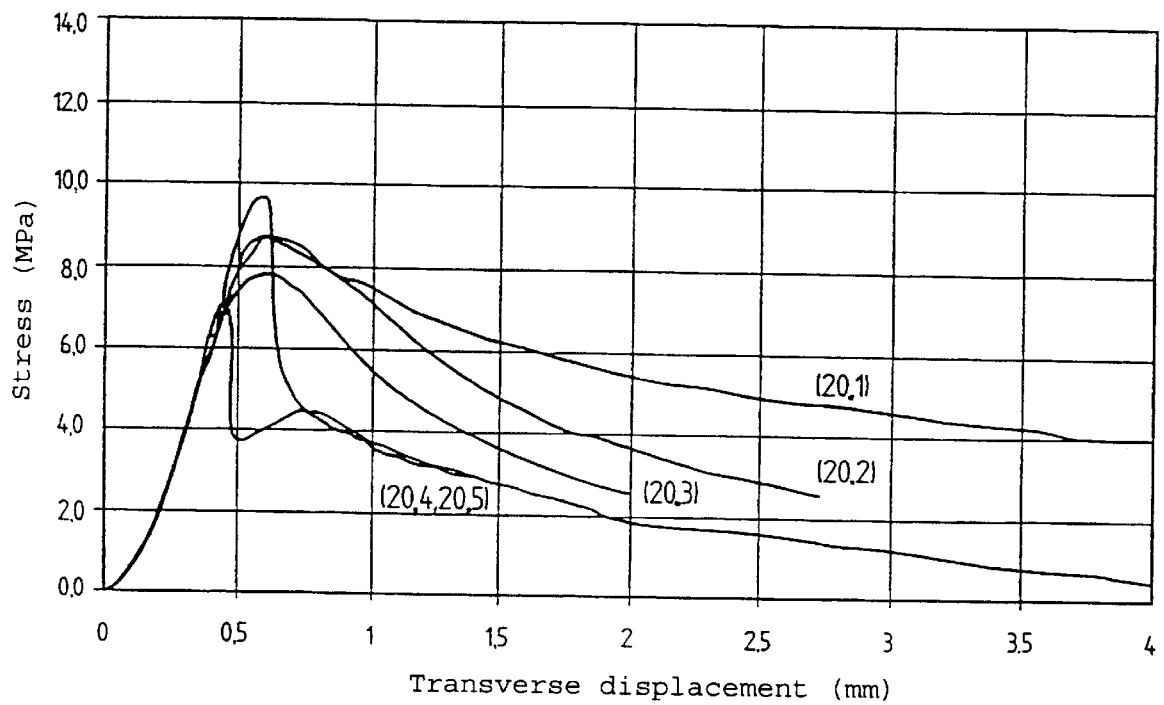
FIG. 3 is a graph obtained by tensile tests on concrete specimens relating to untreated steel fibres, with a W/C ratio of 0.20 and a 90° C. heat treatment, respectively with precipitated silica (curves 20.1, 20.2 and 20.3) and without precipitated silica (curves 20.4 and 20.5).

The results are shown in FIG. 3 which is a graph reproducing the curves obtained in a tensile test on a 7×7×28 cm test piece for a specimen of concrete with 2% by volume of untreated steel fibres, the matrix of which has been modified, or not modified, by adding an amount of the silica suspension RHOXIMAT CS 960 SL from Rhodia Chimie equal to 1.9% as dry-weight equivalent with respect to the cement (i.e. 0.65% by weight with respect to the concrete).

FIG. 3 shows the stress to fracture, expressed in MPa, plotted on the y-axis and the displacement, expressed in mm, plotted on the x-axis. Curves (20.1, 20.2 and 20.3) give the results for three test pieces with silica and curves (20.4 and 20.5) for two identical test pieces without silica. It may be seen that the scatter in the results is appreciably reduced. Furthermore, the energy dissipated after the maximum stress is considerably increased.

Example 21

Influence of the Fibre Diameter

This example is intended to illustrate the influence of the fibre diameter on the fibre/matrix bonding.

The composition of the cementitious matrix is that of Examples 18 and 19. Steel wires having diameters of 100 and 200 μm were introduced into this matrix, these being anchored in the matrix over a length of 5 mm.

Figure 10:
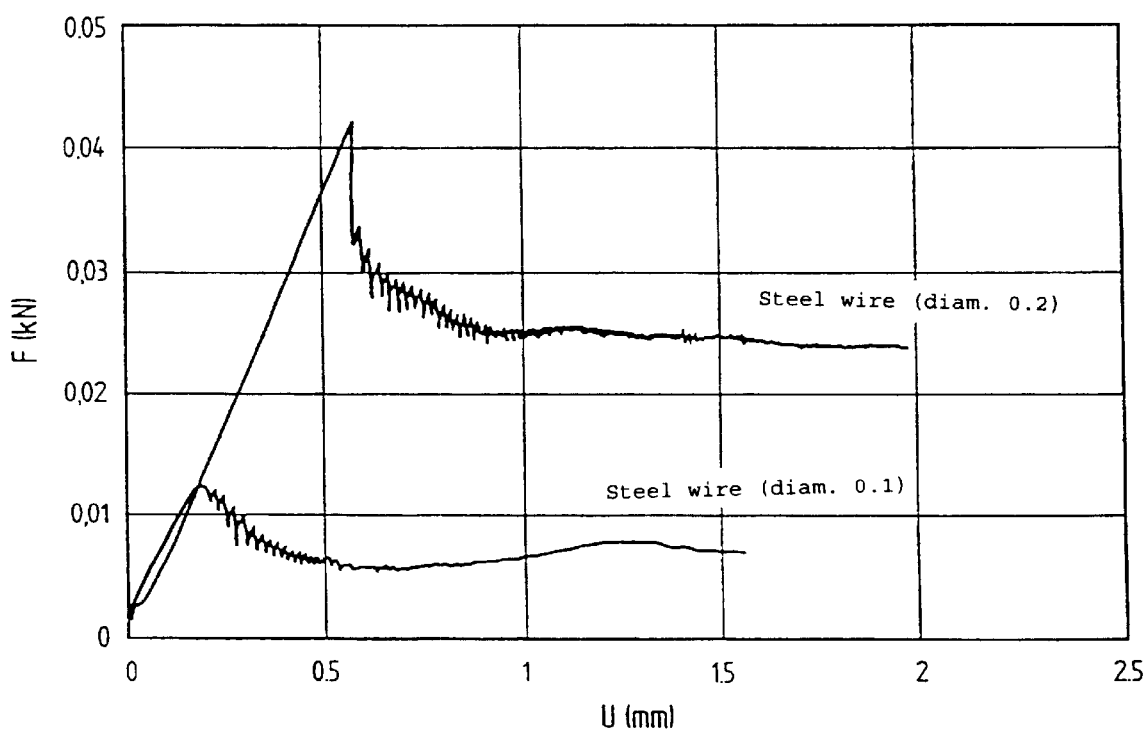
FIG. 10 is a graph obtained from tests of the bonding of steel wires of different diameters. Plotted on the y-axis are the values of the pull-out force (kN) and plotted on the x-axis are the values of the displacement (mm) of the fibre.

The results appear in FIG. 10. For an anchoring length of 5 mm, the bonding is clearly higher when the diameter of the wire increases from 0.1 mm to 0.2 mm.

Example 22

Influence of the Fibre Anchoring Length

This example is intended to illustrate the influence of the fibre anchoring length on the fibre/matrix bonding.

The composition of the cementitious matrix is that of Examples 18 and 19. Steel wires having diameters of 100 and 200 μm were introduced into this matrix with various anchoring lengths.

Figure 11:
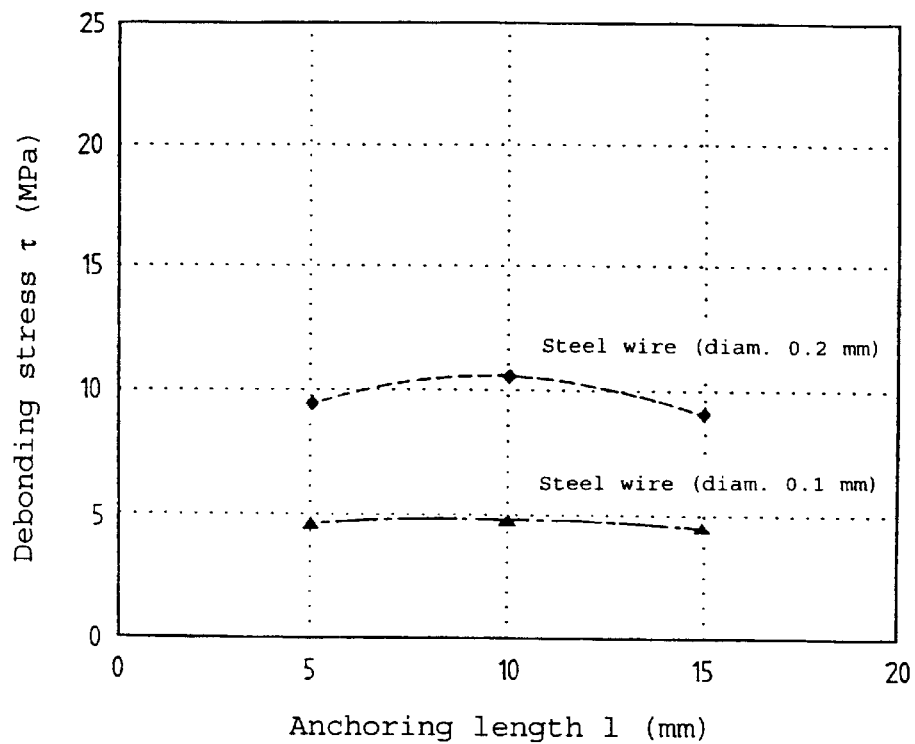
FIG. 11 is a graph obtained from tests of the bonding of steel wires anchored in the concrete over different lengths. Plotted on the y-axis are the values of the debonding stress (MPa) and plotted on the x-axis are the values of the anchoring length (mm).

The results appear in FIG. 11. For a wire having the given characteristics, the bonding level (bonding stress) is constant for anchoring lengths ranging from 5 to 15 mm.

Example 23

Addition of an Anti-foam (or Defoaming) Agent

One means of increasing the bonding of the fibres also consists in adding an anti-foam/defoaming agent to the concrete composition. Thus, Example 16 has been repeated by adding 1% of an anti-foam in solid form (powder).

Figure 12:
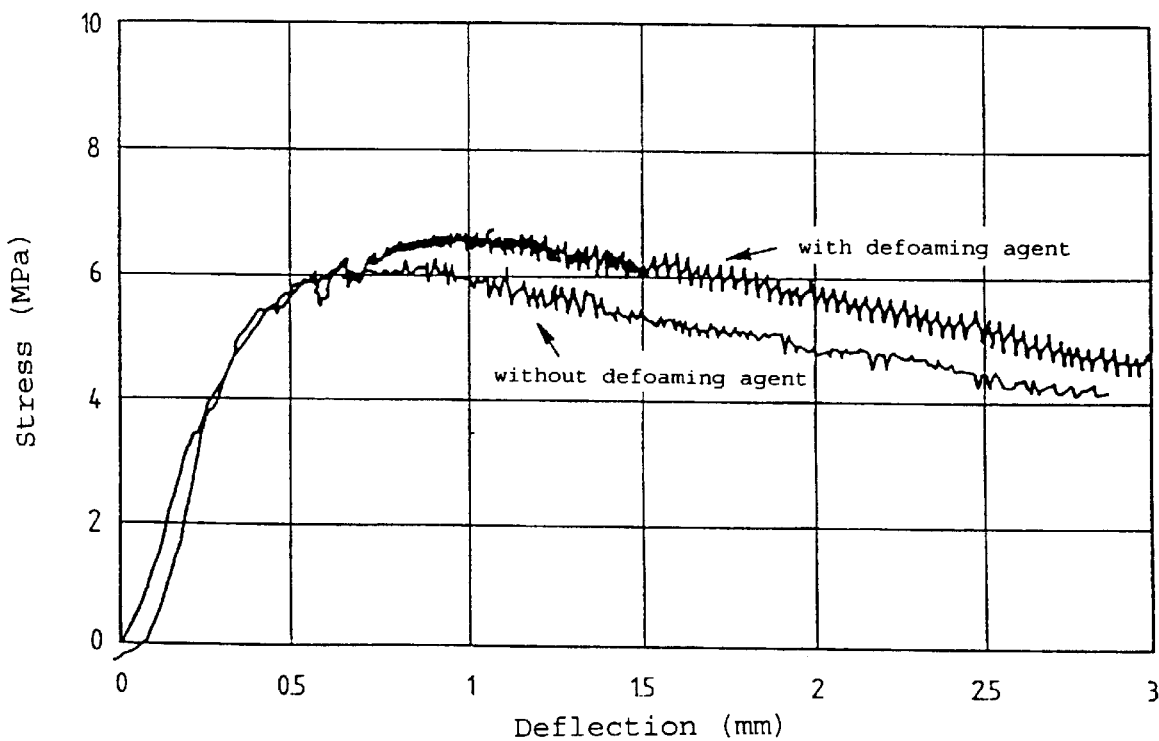
FIG. 12 is a graph obtained from bonding tests on a concrete according to the invention with and without the presence of a defoaming agent. Plotted on the y-axis are the values of the stress (MPa) and plotted on the x-axis are the values of the deflection (mm) for concrete samples with a W/C ratio of 0.24.

The results appear in FIG. 12. A gain is observed at the level of maximum stress (peak) and especially a greater fracture energy due to a better quality of fibre/matrix interface.

Examples 25–29

Influence of the Particle Size of the Constituents of the Concrete

Figure 13:
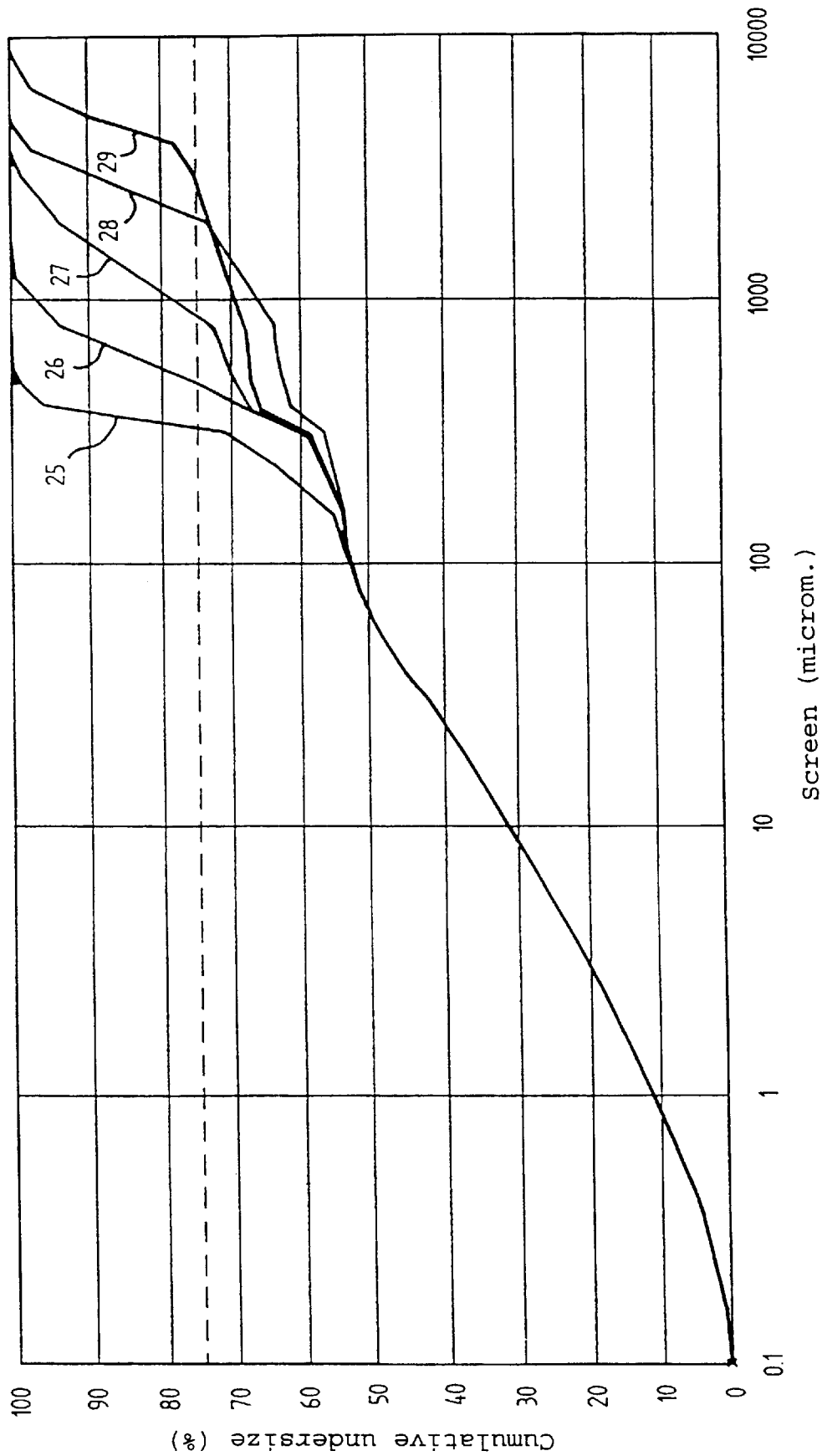
FIG. 13 shows the particle size curves of the sum of the constituents (a)+(b)+(c)+(d) for various concretes according to the invention.

Five concretes according to the invention were prepared from constituents (a), (b), (c) and (d) having various particle size distributions. These particle size distributions are shown in FIG. 13.

It may be seen that, for these 5 concretes, the constituents (a), (b), (c) and (d) satisfy the condition: the D75 particle size is always less than 2 mm and the D50 particle size is less than 150 μm. The particle size distributions differ by the value of the maximum particle size, D100 or Dmax which varies between 500 μm and 6 mm.

Concretes are manufactured from these 5 particle size distributions. Their compositions are given in Table 2. The composition is expressed in percentage by volume with respect to the entire composition.

TABLE 2

| Example | 25 | 26 | 27 | 28 | 29 |
|---|---|---|---|---|---|
| Dmax (mm) | 0.6 | 1 | 2.5 | 4 | 6 |
| HTS cement (a) | 23 | 23 | 23 | 22 | 23 |
| MST silica (c) | 10 | 10 | 10 | 10 | 10 |
| C500 quartz (b) | 7 | 7 | 7 | 7 | 7 |
| BE31 sand (b) (*) | 37 | 14 | 13 | 8 | 11 |
| NI 0.4/1.3 sand (b) (*) | 0 | 24 | 0 | 0 | 0 |
| BB 0.5/2.5 sand (b) (*) | 0 | 0 | 25 | 10 | 7 |
| BB 2/4 sand (b) (*) | 0 | 0 | 0 | 21 | 0 |
| SK 3/6 sand (b) (**) | 0 | 0 | 0 | 0 | 20 |
| NYADG wollastonite (d) | 5 | 5 | 5 | 5 | 5 |
| BEKAERT fibres | 2 | 2 | 2 | 2 | 2 |
| OPTIMA 100 dispersant | 3 | 3 | 3 | 3 | 3 |
| Water | 13 | 12 | 12 | 12 | 12 |

(*) SIFRACO
(**) SILICA and KAOLIN.

The various particle sizes are obtained by varying the nature and the amount of the sands.

Figure 14:
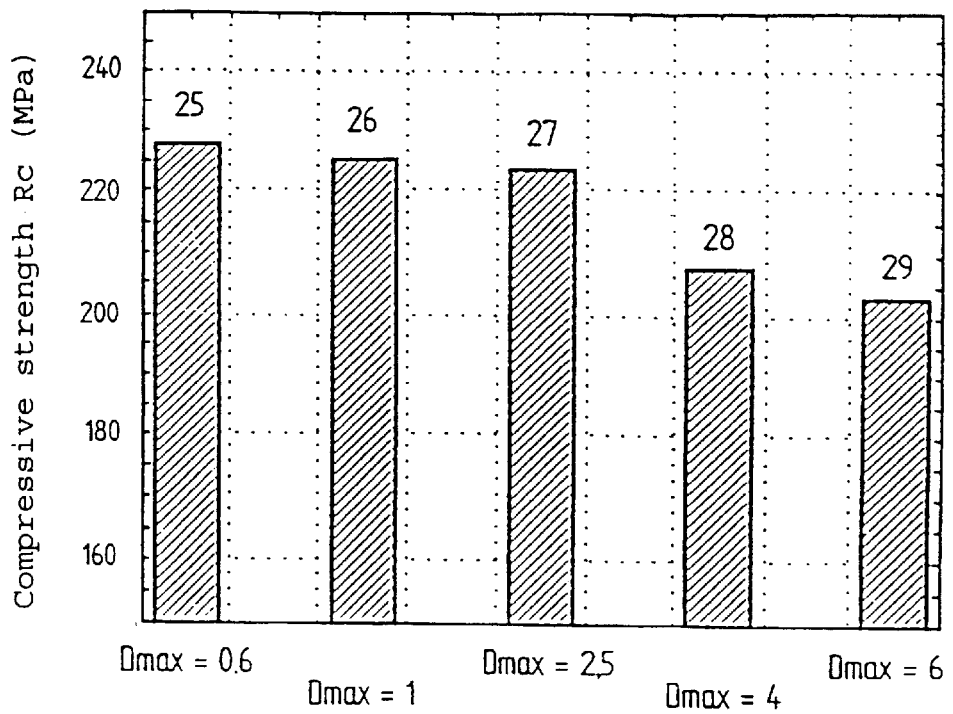
FIGS. 14 and 15 give the properties of concretes having different particle size distributions.
Figure 15:
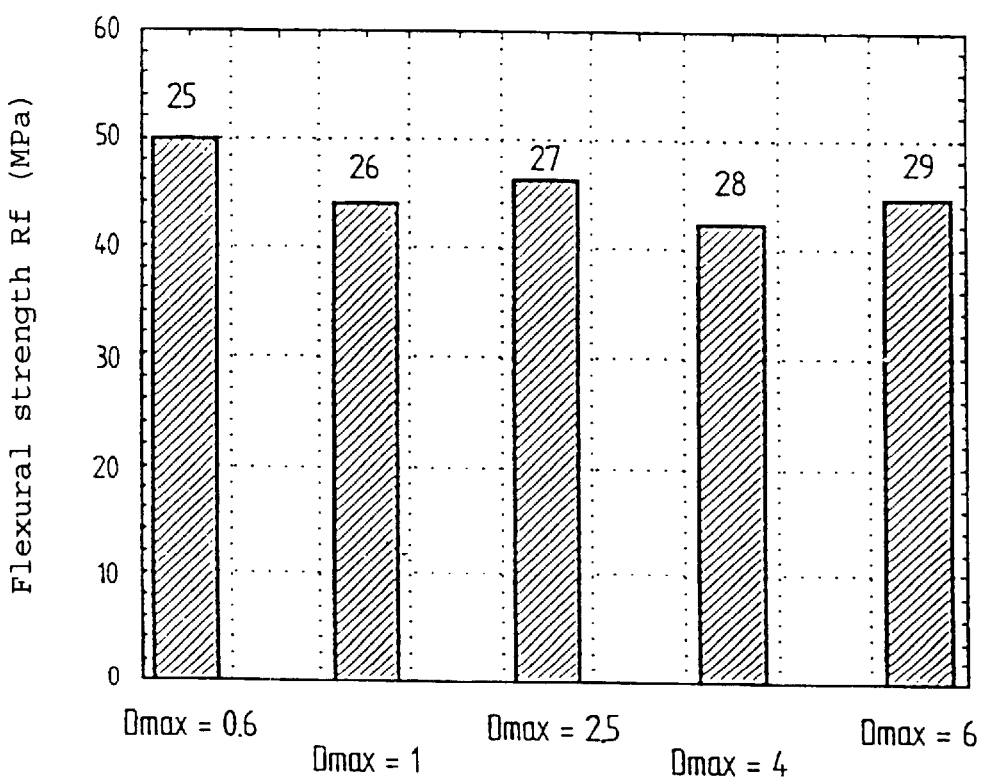

The compressive strengths and the flexural strengths in 3-point bending for 3 different test pieces of each concrete 25 to 29 are given in FIGS. 14 and 15.

It may be seen that, whatever the particle size distribution, and especially the value of Dmax, the compressive strength remains greater than 150 MPa and the flexural strength remains greater than 30 MPa.

Examples 30–33

Effect of the Matrix Toughness/Fibre Bonding Synergy

As indicated in Example 17, there is a synergistic effect between the presence of bonded fibres associated with a high-toughness matrix.

Examples 30–33 demonstrate this synergy. The basic formula of these examples is given in Table 3:

In Example 30, the fibres are steel fibres, wollastonite not being present.

In Example 31, the fibres are steel fibres, wollastonite being present.

In Example 32, the fibres are steel fibres treated by zinc phosphatizing, wollastonite not being present.

In Example 33, the fibres are steel fibres treated by zinc phosphatizing, wollastonite being present.

The concretes are subjected to a 90° C. cure.

Figure 16:
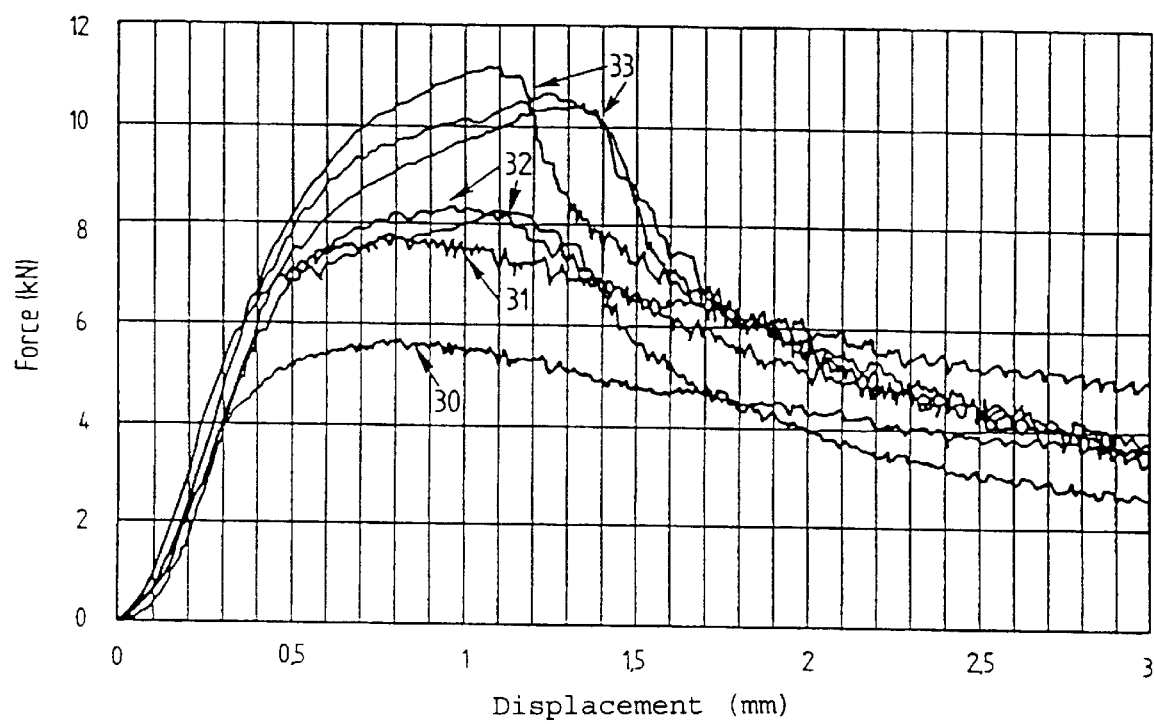
FIG. 16 is a graph demonstrating the synergy effect between the presence of bonded fibres and a high-toughness matrix.

The concretes of Examples 30 to 33 are tested in 3-point bending, the results appear in curves 30 to 33 of FIG. 16 and the key values are given in Table 3 in which the compositions are expressed as weight percentages relative to the cement.

| Example No. | 30 | 31 | 32 | 33 |
|---|---|---|---|---|
| Portland cement (a) | 1 | 1 | 1 | 1 |
| Vitreous silica (c) | 0.325 | 0.325 | 0.325 | 0.325 |
| Quartz flour (b) | 0.3 | 0.3 | 0.3 | 0.3 |
| Acicular wollastonite (d) | 0 | 0.24 | 0 | 0.24 |
| Sand (b) | 1.43 | 1.215 | 1.43 | 1.215 |
| Dispersant (solids content) | 0.018 | 0.018 | 0.018 | 0.018 |
| Water (w/c) | 0.19 | 0.22 | 0.19 | 0.22 |
| Untreated fibres (volume %) | 2 | 2 | 0 | 0 |
| Treated fibres (volume %) | 0 | 0 | 2 | 2 |
| Heat treatment (° C.) | 90 | 90 | 90 | 90 |
| Yield stress (MPa) | 16 | 28 | 29 | 36 |
| Peak stress (MPa) | 25 | 35 | 37.5 | 50 |
| Deflection of the peak (mm) | 0.8 | 0.8 | 1 | 1.2 |

The best mechanical properties are obtained in the case of the treated fibres and the matrix comprising wollastonite of Example 33. it will furthermore be noted that there is a significant work-hardening effect and a damage mechanism by multi-cracking (network of parallel microcracks) and not by mono-cracking.

What is claimed is:

1. A concrete comprising:
   a hardened cementitious matrix including
   (a) cement;
   (b) aggregate particles having a maximum particle size Dmax of at most 2 mm;
   (c) pozzolanic-reaction particles having an elementary particle size of at most 1 μm;
   (d) constituents capable of improving the toughness of the matrix selected from the group consisting of acicular and flaky particles, wherein the particles have an average size of at most 1 mm and which are present in a proportion by volume of between 2.5 and 35% of the combined volume of the aggregate particles (b) and of the pozzolanic-reaction particles (c); and
   (e) at least one dispersing agent;
   (f) metal fibers dispersed in the hardened cementitious matrix, wherein (i) the fibers have an individual length l of at least 2 mm and an l/d ratio of at least 20, d being the diameter of the fibers, (ii) the ratio R of the average length L of the fibers to the maximum particle size Dmax of the aggregate particles is at least 10 and (iii) the amount of fibers is such that their volume is less than 4% of the volume of the concrete after it has set; and
   (g) water, wherein the percentage by weight of water W with respect to the combined weight of the cement (a) and of the particles (c) is in the range 8–24%.

2. The concrete of claim 1, wherein the aggregate particle size is at most 1 mm, the pozzolanic-reaction particle size is at most 0.5 μm, and the amount of fibers is such that their volume is less than 3.5% of the volume of the concrete after it has set.

3. A concrete comprising:
   a hardened cementitious matrix including
   (a) cement;
   (b) aggregate particles;
   (c) pozzolanic-reaction particles having an elementary particle size of at most 1 μm;
   (d) constituents capable of improving the toughness of the matrix selected from the group consisting of acicular and flaky particles, wherein the particles have an average size of at most 1 mm and are present in a proportion by volume of between 2.5 and 35% of the combined volume of the aggregate particles (b) and of the pozzolanic-reaction particles (c); and
   (e) at least one dispersing agent,
   wherein the combination of the constituents (a), (b), (c) and (d) has a D75 particle size of at most 2 mm and a D50 particle size of at most 200 μm;
   (f) metal fibers dispersed in the hardened cementitious matrix, wherein (i) the fibers have an individual length l of at least 2 mm and an l/d ratio of at least 20, d being the diameter of the fibers, (ii) the ratio R of the average length L of the fibers to the D75 particle size of the combination of constituents (a), (b), (c) and (d) is at least 5 and (iii) the amount of fibers is such that their volume is less than 4% of the volume of the concrete after it has set; and
   (g) water, wherein the percentage by weight of water W with respect to the combined weight of the cement (a) and of the particles (c) is in the range 8–24%.

4. The concrete of claim 3, wherein (i) the pozzolanic-reaction particle size is at most 0.5 μm, (ii) the ratio R of the average length L of the fibers to the D75 particle size of the combination of constituents (a), (b), (c) and (d) is at least 10, (iii) the amount of fibers is such that their volume is less than 3.5% of the volume of the concrete after it has set, (iv) the combination of the constituents (a), (b), (c) and (d) has a D75 particle size of at most 1 mm and (v) a D50 particle size of at most 150 μm.

5. The concrete of claim 1, wherein the toughness of the cementitious matrix is at least 15 J/m2.

6. The concrete of claim 5, wherein the toughness of the cementitious matrix is at least 20 J/m2.

7. The concrete of claim 1, wherein the particles (d) have an average size of at most 500 μm.

8. The concrete of claim 1, wherein the particles (d) are present in a proportion by volume in the range 5%–25% of the combined volume of the aggregate particles (b) and of the pozzolanic-reaction particles (c).

9. The concrete of claim 1, wherein the particles (d) of acicular shape are selected from the group consisting of wollastonite fibers, bauxite fibers, mullite fibers, potassium titanate fibers, silicon carbide fibers, cellulose or cellulose-derivative fibers, carbon fibers, calcium phosphate fibers, especially hydroxyapatite HAP fibers, calcium carbonate fibers and derived products obtained by grinding said fibers and mixtures of said fibers.

10. The concrete of claim 9, wherein the particles (d) are wollastonite fibers.

11. The concrete of claim 1, wherein the acicular particles (d) have a length/diameter ratio of at least 3.

12. The concrete of claims 11, wherein the acicular particles (d) have a length/diameter ratio of at least 5.

13. The concrete of claim 1, wherein the flaky particles (d) are selected from the group consisting of mica flakes, talc flakes, mixed silicate (clay) flakes, vermiculite flakes, alumina flakes and mixed aluminate or silicate flakes and mixtures of the said flakes.

14. The concrete of claim 13, wherein the particles (d) are mica flakes.

15. The concrete of claim 1, wherein at least some of the reinforcing particles (d) have, on their surface, a polymeric organic coating which comprises a latex or is obtained from at least one compounds selected from the group consisting of polyvinyl alcohol, silanes, siliconates, siloxane resins, polyorganosiloxanes, the product from reaction between (i) at least one carboxylic acid containing from 3 to 22 carbon atoms, (ii) at least one polyfunctional aliphatic or aromatic amine or substituted amine, containing from 2 to 25 carbon atoms and (iii) a crosslinking agent which is a water-soluble metal complex containing at least one metal selected from the group consisting of zinc, aluminum, titanium, copper, chromium, iron, zirconium and lead.

16. The concrete of claim 1, wherein the average bonding stress of the metal fibers in the hardened cementitious matrix is at least 10 Mpa.

17. The concrete of claim 16, wherein the average bonding stress of the metal fibers in the hardened cementitious matrix is at least 15 MPa.

18. The concrete of claim 1, wherein the fibers are steel fibers.

19. The concrete of claim 18, wherein the fibers have a variable geometry.

20. The concrete of claim 1, wherein the fibers are fibers which have been etched for the purpose of increasing the bonding of the fiber in the cementitious matrix.

21. The concrete of claim 1, wherein the fibers are fibers on which has been deposited a mineral compound for the purpose of increasing the bonding of the fiber in the cementitious matrix.

22. The concrete of claim 1, wherein the fibers have a length between 10–30 mm.

23. The concrete of claim 1, wherein the cementitious matrix further comprises at least one compounds to increase the bonding of the fibers in the matrix.

24. The concrete of claim 23, wherein the compound is selected from the group consisting of silica compounds comprising mostly silica, precipitated calcium carbonate, polyvinyl alcohol in aqueous solution, a latex, and mixtures thereof.

25. The concrete of claim 24, wherein the silica compound is a precipitated silica introduced with a content of between 0.1 and 5% by weight, expressed as dry matter, with respect to the total weight of the concrete.

26. The concrete of claim 25, wherein the precipitated silica is introduced into the composition in the form of an aqueous suspension.

27. The concrete of claim 26, wherein the aqueous suspension has:

a solids content of between 10 and 40% by weight;

a viscosity of less than $4 \times 10^{-2}$ Pa.s for a shear of 50 $s^{-1}$; and an amount of silica contained in the supernatant liquid of the suspension after centrifuging at 7500 rpm for 30 minutes of more than 50% of the weight of the silica contained in the suspension.

28. The concrete of claim 1, wherein the l/Ø ratio of the fibers is at most 200.

29. The concrete of claim 1, wherein the maximum particle size Dmax of the aggregate particles (b) is at most 6 mm.

30. The concrete of claim 1, wherein the aggregate particles (b) are screened or ground sands or mixtures of sands.

31. The concrete of claim 30, wherein the sands comprise silicious sands or quartz flour.

32. The concrete of claim 1, wherein the aggregate particles (b) are present in an amount ranging from 20 to 60% by weight of the cementitious matrix.

33. The concrete of claim 32, wherein the aggregate particles (b) are present in an amount ranging from 25 to 50%, by weight of the cementitious matrix.

34. The concrete of claim 1, wherein the pozzolanic-reaction particles (c) comprise particles selected from the group consisting of silica compounds, silica fume, fly ash, and blast-furnace slag.

35. The concrete of claim 1, wherein the percentage by weight of water W with respect to the combined weight of the cement (a) and of the pozzolanic-reaction particles (c) is between 13–20%.

36. The concrete of claim 1, wherein the concrete is pretensioned.

37. The concrete of claim 1, wherein the concrete is post-tensioned.

38. The concrete of claim 1, wherein the concrete has a direct tensile strength of at least 12 MPa.

39. The concrete of claim 1, wherein the concrete has a flexural strength in 4-point bending (modulus of rupture) of at least 25 MPa.

40. The concrete of claim 1, wherein the concrete has a compressive strength of at least 150 MPa.

41. The concrete of claim 1, wherein the concrete has a fracture energy of at least 2500 J/m2.

42. The concrete of claim 1, wherein after it has set, it undergoes maturing at a temperature substantially equal to ambient temperature.

43. The concrete of claim 1, wherein, after it has set, it undergoes a heat treatment between 60° C. and 100° C. at normal pressure.

44. The concrete of claim 43, wherein the duration of the heat treatment is from 6 hours to 4 days.

45. The concrete of claim 44, wherein the duration of the heat treatment is from 6 h to 72 h.

46. A premix for the production of a concrete having fibers disbursed therein comprising:

(a) cement;

(b) aggregate particles having a maximum particle size Dmax of at most 2 mm;

(c) pozzolanic-reaction particles having an elementary particle size of at most 1 μm;

(d) constituents capable of improving the toughness of the matrix selected from the group consisting of acicular and flaky particles, wherein the particles have an average size of at most 1 mm and present in a proportion by volume of between 2.5 and 35% of the combined volume of the aggregate particles (b) and of the pozzolanic-reaction particles (c); and (e) at least one dispersing agent.

47. The premix of claim 46 further comprising metal fibers having an individual length l I of at least 2 mm and an l/d ratio of at least 20, d being the diameter of the fibers, the ratio R of the average length L of the fibers to the maximum particle size Dmax of the aggregate particles being at least 10.

48. The concrete of claim 21, wherein the mineral compound is silica or a metal phosphate.

* * * * *